(12) United States Patent
Caufield et al.

(10) Patent No.: US 9,424,160 B2
(45) Date of Patent: Aug. 23, 2016

(54) DETECTION OF DATA FLOW BOTTLENECKS AND DISRUPTIONS BASED ON OPERATOR TIMING PROFILES IN A PARALLEL PROCESSING ENVIRONMENT

(71) Applicant: International Business Machines Corporation, Armonk, NY (US)

(72) Inventors: Brian K. Caufield, Livermore, CA (US); Lawrence A. Greene, Plainville, MA (US); Eric A. Jacobson, Arlington, MA (US); Yong Li, Newton, MA (US); Shyam R. Mudambi, Wayland, MA (US); Xiaoyan Pu, Chelmsford, MA (US); Dong J. Wei, Beijing (CN)

(73) Assignee: International Business Machines Corporation, Armonk, NY (US)

(*) Notice: Subject to any disclaimer, the term of this patent is extended or adjusted under 35 U.S.C. 154(b) by 50 days.

(21) Appl. No.: 14/671,102

(22) Filed: Mar. 27, 2015

(65) Prior Publication Data
US 2015/0269006 A1    Sep. 24, 2015

Related U.S. Application Data

(63) Continuation-in-part of application No. 14/217,567, filed on Mar. 18, 2014.

(51) Int. Cl.
| | |
|---|---|
| *G06F 11/34* | (2006.01) |
| *G06F 9/52* | (2006.01) |
| *G06F 9/48* | (2006.01) |
| *G06F 9/50* | (2006.01) |

(52) U.S. Cl.
CPC ......... *G06F 11/3419* (2013.01); *G06F 9/4881* (2013.01); *G06F 9/5083* (2013.01); *G06F 9/524* (2013.01); *G06F 11/34* (2013.01); *G06F 2201/815* (2013.01)

(58) Field of Classification Search
None
See application file for complete search history.

(56) References Cited

U.S. PATENT DOCUMENTS

| | | | |
|---|---|---|---|
| 4,850,027 | A | 7/1989 | Kimmel |
| 4,974,223 | A | 11/1990 | Ancheta et al. |

(Continued)

FOREIGN PATENT DOCUMENTS

| | | |
|---|---|---|
| EP | 0210434 B1 | 9/1993 |
| EP | 0419805 B1 | 11/1995 |

(Continued)

OTHER PUBLICATIONS

"Hadoop Performance Monitoring", hadoop-toolkit wiki, update Jun. 14, 2010 by impetus.opensource. https://code.google.com/p/hadoop-toolkit/wiki/HadoopPerformanceMonitoring.

(Continued)

*Primary Examiner* — Benjamin Wu
(74) *Attorney, Agent, or Firm* — Laura E. Gisler; Susan Murray

(57) ABSTRACT

Data flow disruptions over a series of data processing operators can be detected by a computer system that generates a profile for data flow at an operator. The profile can include data input, processing, and output wait times. Using the profile, the system can detect potential flow disruptions. If the potential disruption satisfies a rule, it is considered a data flow disruption and a recommendation associated with the satisfied rule is identified. The recommendation and the operator identity is displayed.

9 Claims, 16 Drawing Sheets

(56) References Cited

U.S. PATENT DOCUMENTS

| | | | |
|---|---|---|---|
| 5,473,773 A | 12/1995 | Aman et al. | |
| 5,517,323 A | 5/1996 | Propach et al. | |
| 5,539,531 A | 7/1996 | Propach et al. | |
| 5,566,000 A | 10/1996 | Propach et al. | |
| 5,937,202 A | 8/1999 | Crosetto | |
| 6,311,265 B1* | 10/2001 | Beckerle | G06F 8/20 |
| | | | 712/203 |
| 6,330,008 B1* | 12/2001 | Razdow et al. | 715/772 |
| 6,434,613 B1* | 8/2002 | Bertram | G06F 11/3433 |
| | | | 709/220 |
| 6,457,143 B1 | 9/2002 | Yue | |
| 6,470,464 B2* | 10/2002 | Bertram | G06F 11/3447 |
| | | | 702/186 |
| 6,557,035 B1* | 4/2003 | McKnight | G06F 11/3452 |
| | | | 709/202 |
| 6,721,826 B2 | 4/2004 | Hoglund | |
| 6,801,938 B1* | 10/2004 | Bookman | G06F 17/2258 |
| | | | 707/999.201 |
| 6,970,805 B1* | 11/2005 | Bierma | G06F 11/3433 |
| | | | 702/182 |
| 7,203,746 B1 | 4/2007 | Harrop | |
| 7,299,216 B1 | 11/2007 | Liang et al. | |
| 7,673,291 B2 | 3/2010 | Dias et al. | |
| 7,689,690 B2 | 3/2010 | Loboz et al. | |
| 7,748,001 B2 | 6/2010 | Burns et al. | |
| 8,041,834 B2 | 10/2011 | Ferri et al. | |
| 8,055,367 B2 | 11/2011 | Kneisel et al. | |
| 8,122,050 B2 | 2/2012 | Mordvinov et al. | |
| 8,126,315 B2 | 2/2012 | Kim et al. | |
| 8,225,291 B2 | 7/2012 | Chung et al. | |
| 8,234,635 B2 | 7/2012 | Isshiki et al. | |
| 8,370,823 B2 | 2/2013 | Bashkansky et al. | |
| 8,738,972 B1* | 5/2014 | Bakman | G06F 11/00 |
| | | | 714/47.1 |
| 2003/0014507 A1* | 1/2003 | Bertram | G06F 11/3409 |
| | | | 709/223 |
| 2003/0061324 A1* | 3/2003 | Atherton | G06F 11/3409 |
| | | | 709/223 |
| 2003/0061413 A1 | 3/2003 | Hoglund | |
| 2004/0015381 A1 | 1/2004 | Johnson et al. | |
| 2004/0059701 A1 | 3/2004 | Fedorov | |
| 2006/0218450 A1 | 9/2006 | Malik et al. | |
| 2008/0127149 A1* | 5/2008 | Kosche | G06F 8/443 |
| | | | 717/158 |
| 2008/0222634 A1 | 9/2008 | Rustagi | |
| 2008/0282232 A1* | 11/2008 | Cong | G06F 11/3404 |
| | | | 717/127 |
| 2009/0066712 A1 | 3/2009 | Gilger | |
| 2009/0077005 A1 | 3/2009 | Yung et al. | |
| 2009/0307597 A1* | 12/2009 | Bakman | G06F 11/008 |
| | | | 715/736 |
| 2010/0036810 A1* | 2/2010 | Wu | G06F 11/3495 |
| | | | 707/706 |
| 2011/0061057 A1 | 3/2011 | Harris et al. | |
| 2011/0179371 A1 | 7/2011 | Kopycinski et al. | |
| 2011/0229071 A1 | 9/2011 | Vincelette et al. | |
| 2012/0044814 A1 | 2/2012 | Natarajan et al. | |
| 2012/0054147 A1 | 3/2012 | Goetz et al. | |
| 2012/0154405 A1 | 6/2012 | Baumgartner et al. | |
| 2012/0278594 A1 | 11/2012 | Kumar et al. | |
| 2012/0327794 A1 | 12/2012 | Han et al. | |
| 2013/0024179 A1 | 1/2013 | Mazzaro et al. | |
| 2013/0176871 A1 | 7/2013 | Bertze et al. | |
| 2013/0185702 A1 | 7/2013 | Choi et al. | |
| 2014/0026150 A1* | 1/2014 | Kline | G06Q 40/04 |
| | | | 718/107 |
| 2014/0278337 A1* | 9/2014 | Branson | G06F 11/3457 |
| | | | 703/22 |
| 2014/0280895 A1* | 9/2014 | Branson | H04L 65/60 |
| | | | 709/224 |
| 2015/0058865 A1* | 2/2015 | Slinger | G06F 9/46 |
| | | | 718/106 |
| 2015/0193368 A1* | 7/2015 | Caufield | G06F 13/36 |
| | | | 710/310 |

FOREIGN PATENT DOCUMENTS

| | | |
|---|---|---|
| EP | 1296220 A2 | 3/2003 |
| EP | 0963102 B1 | 1/2006 |
| JP | 2010115442 A | 5/2010 |
| JP | 4790793 B2 | 10/2011 |
| WO | 2006102442 A2 | 9/2006 |
| WO | 2014143247 A1 | 9/2014 |

OTHER PUBLICATIONS

Informatica, "Proactive Monitoring Option: Identify Data Integration Risks Early and Improve Governance with Proactive Monitoring", (Enterprise Data Integration: Power Center: Options), © 2013 Informatica Corporation. http://www.informatica.com/us/products/enterprise-data-integration/powercenter/options/proactive-monitoring-option/.

Oracle, "3: Monitoring the ETL Process", Oracle® Argus Mart Administrator's Guide, Release 1.0, Apr. 2013, Copyright © 2011, 2013 Oracle. http://docs.oracle.com/cd/E40596_01/doc.10/e38589/monitoringetl.htm#BGBHCCBH.

Battre et al., "Detecting Bottlenecks in Parallel DAG-based Data Flow Programs," 2010 IEEE Workshop on Many-Task Computing on Grids and Supercomputers, Nov. 15, 2010, pp. 1-10 DOI: 10.1109/MTAGS.2010.5699429.

Ravali et al., "Implementing Bottleneck Detection Algorithm in IaaS Cloud for Parallel Data Processing Using," International Journal of Computer Science and Management Research, Aug. 2013, vol. 2, Issue 8 ISSN 2278-733X.

Warneke, D., "Massively Parallel Data Processing on Infrastructure as a Service Platforms," Sep. 28, 2011.

Iqbal et al., "SLA-Driven Automatic Bottleneck Detection and Resolution for Read Intensive Multi-tier Applications Hosted on a Cloud," Advances in Grid and Pervasive Computing, Lecture Notes in Computer Science vol. 6104, pp. 37-46, 2010, Copyright Springer-Verlag Berlin Heidelberg 2010.

Greene et al., "Performance Management for Data Integration ," U.S. Appl. No. 14/217,567, filed Mar. 18, 2014.

Mell et al., "The NIST Definition of Cloud Computing," National Institute of Standards and Technology, U.S. Department of Commerce, Special Publication 800-145, Sep. 2011.

Caufield et al., "Apparatus and Method for Identifying Performance Bottlenecks in Pipeline Parallel Processing Environment," U.S. Appl. No. 14/148,697, filed Jan. 6, 2014.

IBM, "General Purpose Bottleneck Analysis for Distributed Data Movement Applications," An IP.com Prior Art Database Technical Disclosure, IP.com No. 000138798, Original Publication Date: Aug. 4, 2006, IP.com Electronic Publication: Aug. 4, 2006.

Longcore, J., "Bottleneck identification in cycle time reduction and throughput improvement efforts in an automotive transmission plant," An IP.com Prior Art Database Technical Disclosure, IP.com No. 000128111, Original Publication Date: Dec. 31, 1999, IP.com Electronic Publication: Sep. 14, 2005.

* cited by examiner

DETECTION OF DATA FLOW BOTTLENECKS AND DISRUPTIONS BASED ON OPERATOR TIMING PROFILES IN A PARALLEL PROCESSING ENVIRONMENT

BACKGROUND

The present disclosure relates to data integration, and more specifically, to performance monitoring and analysis for data integration.

Data integration may be described as extracting data from a source, transforming the data, and loading the data to a target. That is, data integration is Extract, Transform, Load (ETL) processing. Data integration processing engines may be scalable and capable of processing large volumes of data in complex data integration projects. It is common for multiple users (e.g., customers) and projects to share a single data integration processing engine that is responsible for handling all of the data integration processing for those multiple users. This high volume and highly concurrent processing may be resource intensive, and users try to balance the availability of system resources with the need to process large volumes of data efficiently and concurrently.

Workload management capabilities may be available at Operating System (OS) or lower levels. Workload management operates at a level that is removed from the data integration environment.

SUMMARY

Embodiments of the present disclosure may be directed toward a computer method for detecting data flow disruptions over a series of data processing operators, where each data processing operator is configured to receive and store data in an input record block, process the data from the input record block, store results of the processing in an output record block, and output data from the output record block to the next processing operator in a series. This method can begin when a system generates, for a particular processing operator, a processing operator timing profile. The timing profile can include an input wait time based upon a period of time that a particular data set is stored in a particular input data record. The profile can also include an operator processing time based upon a period of time between a start of processing of the particular data set by the particular processing operator and a completion of the processing of the particular data set by the particular processing operator. The timing profile can also include an output wait, which is based on a period of time the particular data set is stored in an output data record block. From the processing operator timing profile, the system can then detect a potential flow disruption condition and determine that that profile satisfies at least one flow disruption rule. Each flow disruption rule can be associated with at least one corresponding recommendation. The system can then use the rule to identify a corresponding recommendation, and display that recommendation and the identity of the processing operator.

Embodiments of the present disclosure may be directed toward a computer system for detecting data flow disruptions over a series of data processing operators. Each data processing operator can receive and store data in an input record block, process data from the input record block, store results of the processing in an output record block, and output data from the output record block to a next processing operator in the series. One or more processing circuits can generate a processing operator timing profile for a particular processing operator. The processing operator timing profile can include an input wait time which can be based upon a period of time that a data set is stored in an input data record; the profile can also include an operator processing time based upon a period of time between a start of processing of the particular data set by the particular processing operator and a completion of the processing of the particular data set by the particular processing operator. The profile also includes an output wait time based upon a period of time that the particular data set is stored in a particular output data record block. The processing circuit can also detect a potential flow disruption condition from the timing profile and determine that the processing operator timing profile satisfies a flow disruption rule that is associated with a corresponding recommendation. The circuit can identify the corresponding recommendation and display the recommendation and the identity of the processing operator.

Embodiments of the present disclosure may be directed toward a computer program product for detecting data flow disruptions over a series of data processing operators. Each operator can receive and store data in an input record block, process data from the input record block, store results of the processing in an output record block, and output data from the output record block to a next processing operator in the series. The computer program product has a computer readable storage medium with program instructions. The program instructions can be executed by a computer processing circuit to generate a processing operator timing profile for a particular processing operator in the series of operators that includes an input wait time based on the time that a data set is stored in an input data record. The profile can also include an operator processing time based upon a time between a start of processing by the processing operator and a completion of the processing by the processing operator. The profile can also include an output wait time based upon the time that the particular data set is stored in a particular output data record block. From the timing profile, the circuit can detect a potential flow disruption condition. The system can determine that the processing operator timing profile satisfies a flow disruption rule that is associated with a corresponding recommendation. It can identify the corresponding recommendation and display the recommendation and the identity of the processing operator.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
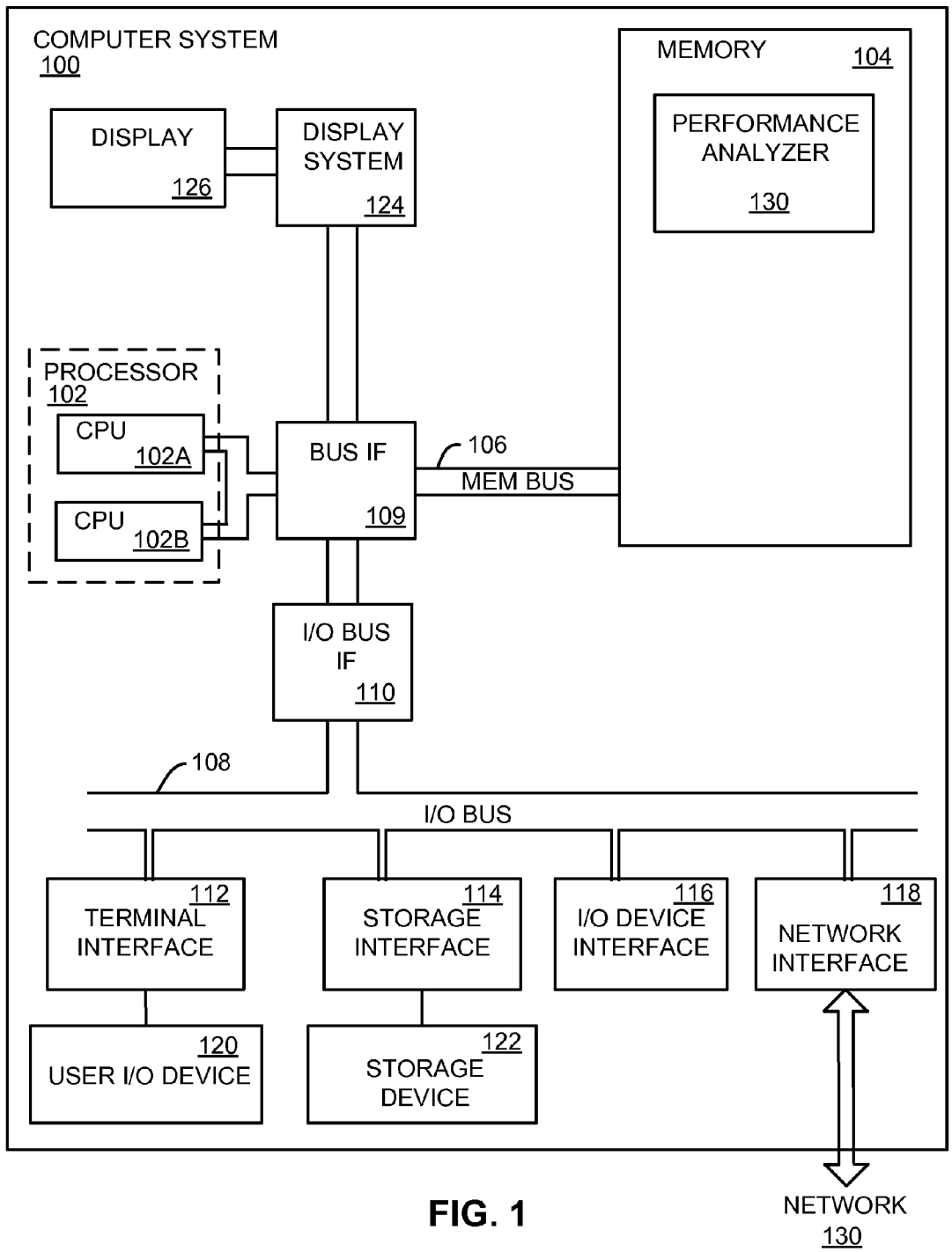
FIG. 1 depicts a schematic block diagram illustrating a computer system, according to various embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

DETAILED DESCRIPTION

Aspects of the present disclosure relate to data integration, and more specifically, to performance monitoring and analysis for data integration. Aspects include executing a data integration job and collecting performance data and/or resource utilization data with a performance analyzer. The collected data may be presented to a user in real-time or as a replay with the performance analyzer for the user to determine and correct issues with the job flow of the data integration job. The performance analyzer may determine when an issue is present and recommended solutions to a user as to correct or lessen the issue. Definable rules when analyzing the data may help determine actions to correct for problems. While the present disclosure is not necessarily limited to such applications, various aspects of the disclosure may be appreciated through a discussion of various examples using this context.

In large data integration use cases, due to complex business requirements, it is common to have several hundreds of stages in a single data flow. To leverage system resources effectively, a parallel engine that executes such complex data flow may choose to implement a pipeline mechanism, that is, to have many processes concurrently executing and one's output is directed to another's input using various techniques such as shared memory, TCP/IP socket, or named pipe. With this technique, as soon as a record is produced by producer and written to the pipeline, it is read and processed by consumer. After this step finishes, this consumer writes its own output to next pipeline, which is further processed by its downstream consumers. All processes are simultaneously executing, and the intermediate results are not landed on disk, so such parallel engine architecture can efficiently leverage available system resources.

Further, to speed up data processing for large data set, the parallel engine may implement a data-partitioned mechanism, that is, an entire input dataset is partitioned into multiple smaller segments based on a specific partitioning algorithm, and each segment is sent to a separate instance of a processing stage. With this technique, if a processing stage needs to process 1 billion records, if using one instance, all 1 billion records would flow though that stage. If there are 2 instances of the same stage, and data is evenly distributed across those two instances, then each instance would process 500 million records. As long as the system still has available resources, partitioning would significantly reduce the total processing time of the entire data flow.

Parallel data processing engines are powerful and efficient means of processing large volumes of data, (e.g. in data integration and data warehousing scenarios). The data processing applications executed by these engines can be made up of a complex system of processes and/or threads (herein also called "operators"), working in parallel to perform required data manipulations. Data can be passed from one operator to another via record blocks. Each operator can get the data to be processed from its input record block and write the data it has processed to its output record block. These record blocks are shared with the previous and subsequent operators as their output and input record blocks, respectively. The overall throughput of the application can be determined by the slowest operator in the set, as the rate of consumption and production for the slowest operator can have a ripple effect throughout the application.

A parallel engine that implements both pipeline and data-partitioned mechanisms can deliver good performance and scalability for extract, transform, load (ETL) data flows. Today, numerous large enterprise customers rely on such systems to build their backbone for information integration and data warehousing applications.

From time to time, due to data flow design, network configuration, storage system performance issue, or parallel engine defect, customers may run into performance problems for parallel data flow, sometime those data flows can grind to halt. For example, some common performance problems are:

A custom operator that has inefficient algorithm

Incorrect buffering or sorting property that breaks the pipelining mechanism

Invalid/unexpected data causes one step to run into an infinite loop without any output being produced One of the steps makes a network call, for instance, trying to connect to a database server or a message queue end point, and the call blocks or takes very long time to return.

Slow disk I/O impacting sort

Insufficient memory impacting lookup/join

Too many concurrent executing jobs with limited resources

Large job with inefficient design patterns: incorrect fork-join patterns, unnecessary splitting and merging, duplicated stages Incorrect parameter settings When debugging such a problem, one has to collect information needed across various files, including job design, job execution log, input data files, schemas, configuration files, performance data files, etc. A typical debugging process starts with analyzing the job execution log. A log file could normally contain a lot of messages with no clear correlation between one another.

For simple to moderate data flows, it might be manageable to collect information from various files and manually analyze such information to find the root cause. For complex data flow that has several hundreds of stages with many partitioning methods employed, it can be very daunting to find out where the weakest spot or bottleneck is and what the right solution to solve the performance problem is. Very often, being able to pinpoint the exact bottleneck can significantly speed up the problem resolution. For example, an application that consists of 5 processes might show all 5 processes running at 10% computer processing unit (CPU) usage and processing 1,000 rows of data per second. However, it may be unclear as to whether this usage lag is caused by the processing capacity of the last operator in the row, the maximum production rate of the first operator in the flow, a bottleneck somewhere in the middle, or another cause.

Embodiments herein provide for a dynamic graphic view on job performance data regardless of whether the job is executed in a parallel execution environment or a distributed execution environment. In various embodiments, capabilities to analyze the performance data and present performance improvement recommendations to the end users are disclosed.

Embodiments herein can detect, track, and report record block transport statistics to performance data collection processes to help detect bottlenecks as they arise. Embodiments can also measure the degree of bottleneck impact on each stage in the data flow. Based on the statistics collected, a bottleneck can be detected, and corrective actions can be prescribed and/or implemented.

The bottleneck detection and tracking can use an input/output (I/O) tracking mechanism built on top of a record block transport layer. The record block can be monitored while it is traveling throughout the data flow across various I/O links on all the partitions of each operator, using several time-related parameters associated with each record block. Statistics or "time stamps" can be collected according to the time-related parameters for each record block and used to create a processing operator timing profile for each particular operator.

FIG. 1 is a schematic block diagram illustrating one embodiment of a computer system 100. The computer system 100 is one exemplary context in which embodiments may be implemented. The mechanisms and apparatus of the various embodiments disclosed herein apply equally to any appropriate computing system. The major components of the computer system 100 include one or more processors 102, a memory 104, a terminal interface 112, a storage interface 114, an Input/Output ("I/O") device interface 116, and a network interface 118, all of which are communicatively coupled, directly or indirectly, for inter-component communication via a memory bus 106, an I/O bus 108, bus interface unit ("IF") 109, and an I/O bus interface unit 110.

The computer system 100 may contain one or more general-purpose programmable central processing units (CPUs) 102A and 102B, herein generically referred to as the processor 102. In an embodiment, the computer system 100 may contain multiple processors; however, in another embodiment, the computer system 100 may alternatively be a single CPU system. Each processor 102 executes instructions stored in the memory 104 and may include one or more levels of on-board cache.

In an embodiment, the memory 104 may include a random-access semiconductor memory, storage device, or storage medium (either volatile or non-volatile) for storing or encoding data and programs. In another embodiment, the memory 104 represents the entire virtual memory of the computer system 100, and may also include the virtual memory of other computer systems coupled to the computer system 100 or connected via a network 130. The memory 104 is conceptually a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the following: a performance analyzer 130. This program and data structures are illustrated as being included within the memory 104 in the computer system 100, however, in other embodiments, some or all of them may be on different computer systems and may be accessed remotely, e.g., via a network 130. The computer system 100 may use virtual addressing mechanisms that allow the programs of the computer system 100 to behave as if they only have access to a large, single storage entity instead of access to multiple, smaller storage entities. Thus, while the performance analyzer 130 is illustrated as being included within the memory 104, it may not necessarily all be completely contained in the same storage device at the same time.

In an embodiment, performance analyzer 130 may include instructions or statements that execute on the processor 102 or instructions or statements that are interpreted by instructions or statements that execute on the processor 102 to carry out the functions as further described below. In another embodiment, performance analyzer 130 may be implemented in hardware via semiconductor devices, chips, logical gates, circuits, circuit cards, and/or other physical hardware devices in lieu of, or in addition to, a processor-based system. In an embodiment, the performance analyzer may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In an embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In another embodiment, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 is intended to depict the representative major components of the computer system 100, according to various embodiments. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
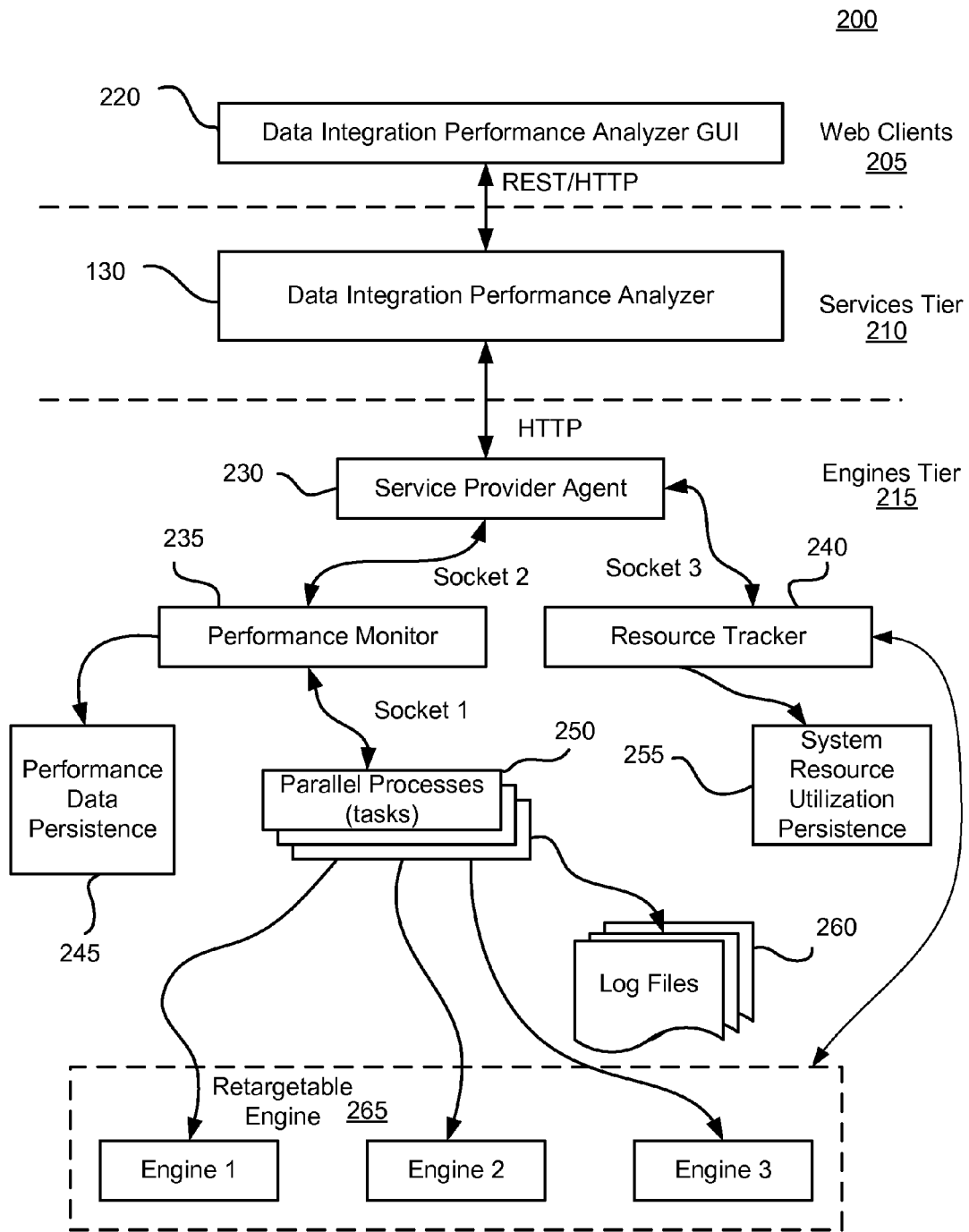
FIG. 2 depicts a system in which a performance analyzer operates, according to various embodiments.

FIG. 2 depicts a system 200 in which the performance analyzer 130 is incorporated, according to various embodiments. The performance analyzer 130 may be hosted in an application server and be made available as a web application. In other embodiments, the performance analyzer 130 may be hosted as a rich client application using Eclipse plug-in architecture, or implemented as C# application. FIG. 2 illustrates how to deploy the performance analyzer 130 as a web application as an example. The system 200 may include the web clients 205, the services tier 210, and the engines tier 215. The web client 205 may be where a user opens and executes the performance analyzer 130 with a performance analyzer graphical user interface (GUI) 220. The user may send requests through the performance analyzer GUI 220 to the performance analyzer 130, which may be executing commands on the services tier 210. The web clients 205 and the services tier 210 may be on separate machines that communicate over a network. In other various embodiments the performance analyzer GUI 220 and the performance analyzer 130 may be on the same machine.

The services tier 210 may include the performance analyzer 130 which may collect data from a data flow of a data integration job execution in the engines tier 215. The performance analyzer 130 may collect a job execution plan and design metadata, performance monitoring data, and system resource utilization data from the engines tier 215 where the data integration is occurring. The services tier 210 may also receive requests from the user in the web clients 205 on which data it needs to receive from the engines tier 215 and commands to send to the engines tier 215. The services tier 210 may be on a different server than the engines tier 215, the services tier 210 and the engines tier 215 may communicate over a network.

The engine tier 215 may be where the data integration job is being performed. A service provider agent 230 may be in communication with the performance analyzer 130 of the services tier 210. The service provider agent 230 may receive requests for data from the performance analyzer 130, retrieve the data that is requested by the performance analyzer 130, and send the data to the performances analyzer 130 over the network when the service tier 210 and engines tier 215 are on different servers. Within the engines tier 215 the service provider agent 230 may be in communication with a performance monitor 235 and a resource tracker 240 through respective sockets.

The performance monitor 235 may gather real-time performance data of the data flow of one or more parallel processes 250 of the data integration job. The gathering of performance data may be done at a tunable interval which may be based on every N records or every N seconds, for example. The parallel processes 250 may be multiple jobs being performed in multiple environments. The multiple environments may be different retargetable engines 265 such as a parallel engine or a distributed engine. The performance monitor 235 may also store the real-time performance data from the parallel processes 250 in a performance data database 245 for later use by serializing the data.

The resource tracker 240 may receive dynamic real-time system resource utilization data. The resource tracker 240 may also store system resource utilization data in a system resource utilization database 255 by serializing the data. The resource tracker may be in communication with the retargetable engines 265. The resource tracker 240 may be independent of the engine with which it communicates so the resource tracker 240 may be used to monitor resource utilization for both parallel and distributed environments. Log files 260 may also be produced by the parallel processes 250 and may be requested by the performance analyzer 130 and used by the performance analyzer 130 to determine areas of the data flow where data integration issues occur.

In various embodiments, the performance analyzer 130 may be requesting, gathering, and analyzing data in real-time while in an on-line mode. In various embodiments, the performance analyzer 130 may be used in an offline mode where the performance analyzer 130 receives past data of a data integration job execution by loading performance data from the performance data database 245, system resource data form the system resource utilization database 255, and log files 260, for example. The performance analyzer 130 should be able to replay the job execution in a simulated mode, so that users can understand how the job transitions its state and correlates state transitions to the job logs. Also, in offline mode, the performance analyzer 130 may build an execution plan representation and create snapshots to show job execution progress at various time intervals. The offline mode may be useful for post-execution (remote) analysis. For example, the user may send all the files to technical support. A support engineer may import all the files to the performance analyzer 130 and conduct post-execution analysis to identify any performance patterns or issues.

In the on-line, real-time analysis done the by the performance analyzer 130, a request may be sent from the web-client 205 to the performance monitor 235 to receive an execution plan and metadata information of the job execution. The performance analyzer 130 uses this information to build the data flow representation. The performance analyzer 130 then regularly polls performance data and resource utilization data to show job execution progress. The performance analyzer 130 may be used to analyze the performance for job executions on different types of retargetable engines 265 (e.g. parallel engine or distributed engine).

Figure 3:
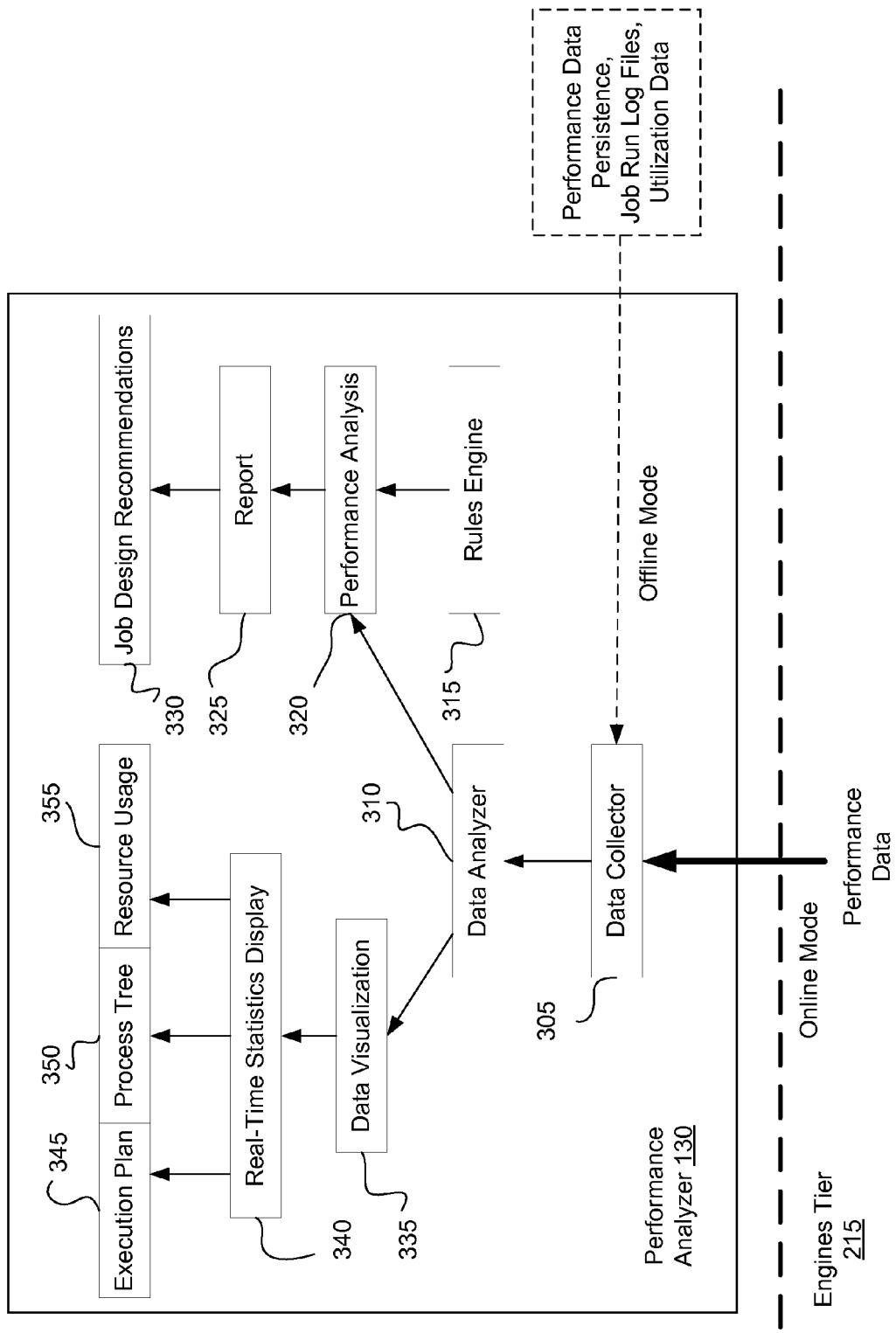
FIG. 3 illustrates a block diagram of components of the performance analyzer, according to various embodiments.

FIG. 3 illustrates a block diagram of components of the performance analyzer 130, according to various embodiments. The performance analyzer may have components that include a data collector 305, data analyzer 310, a rules engine 315, a performance analysis module 320, a report 325, one or more job design recommendations 330, a data visualization module 335, and a statistics display 340 that may display an execution plan 345, a process tree 350, and resource usage 355.

In various embodiments, the data collector 305 may receive data from the engines tier 215 of FIG. 2. The data may include performance data and resource utilization data in the online mode. In an offline mode, the data collector 305 may receive performance data from the performance data persistence 245, job execution log files 260, and system resource utilization data from the system resource utilization persistence 255. The data collector 305 may send the data collected to the data analyzer 310. The data analyzer 310 may determine which data to send to the performance analysis module 320 and the data visualization module 335.

The performance analysis module 320 may analyze the data coming into the performance analyzer 130 with one or more rules from the rules engine 315. The rules engine 315 may have one or more rules that may define certain actions to take when data shows a certain criteria. The rules may be flexible in that an operator may define the rules. Based on the analysis of the rules and the data, the performance analysis module 320 may produce the report 325. The report 325 may include recommendations that a user may take to correct performance issues. The recommendations may be accessible to a user in the performance analyzer graphical user interface 220 of FIG. 2 in the job design recommendations view 330.

In various embodiments, the data analyzer 310 may send data to the data visualization module 335. The data visualization module 335 may compile the data into visual displays such as a statistic display 340. The statistic display 340 may display through the performance analyzer GUI 220 graphical execution plan 345, the process tree 350, and resource usage 355. These visual displays may assist the user in determining corrective action for performance issues and where the performance issues are occurring.

Figure 4:
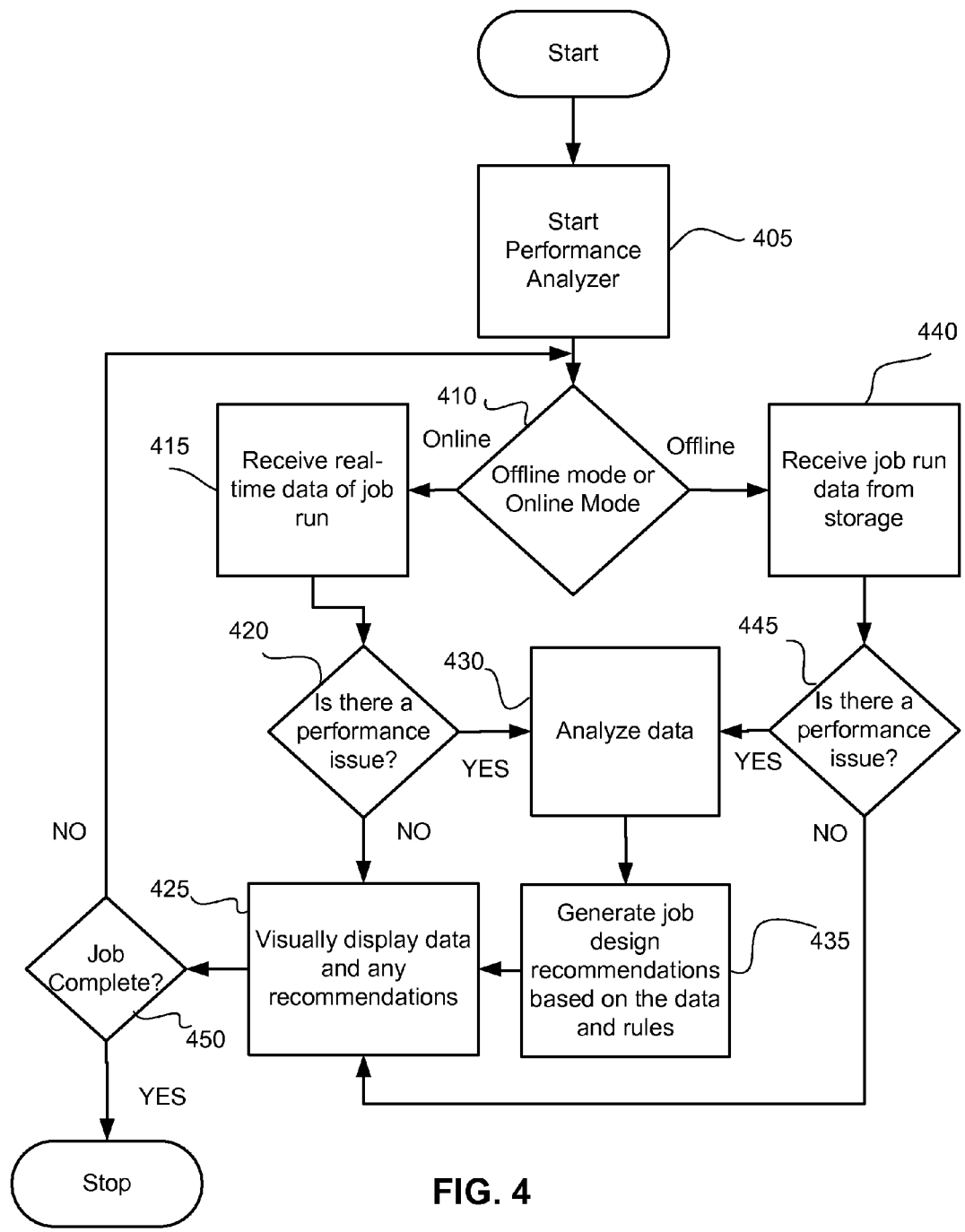
FIG. 4 illustrates a flow diagram of a method of monitoring and analyzing data integration, according to various embodiments.

FIG. 4 illustrates a flow diagram of a method 400 of monitoring and analyzing data integration, according to various embodiments. In operation 405, the performance analyzer may be initiated. In operation 410, the performance analyzer may be ran in an offline mode or an online mode. If the performance analyzer in is in an online mode, then a data integration job is being performed while the performance analyzer is executing and the method 400 may continue with operation 415. In operation 415, the performance analyzer may receive real-time data of the data integration job such as performance data and resource utilization data. The method 400 may continue with operation 420.

In operation 420, the performance analyzer may determine from the data of the data integration job whether there is a performance issue or not. If there is no performance issue, then the performance analyzer may visually display the data of the data integration in operation 425 and the method 400 may end. If there is a performance issue, then the performance analyzer may analyze the data it receives from the data integration in operation 430. The data analyzer of the performance analyzer may determine what is causing the issue based on rules. The data analyzer may generate recommendations for the job design of the data integration job in operation 435 which is also based on the rules, the issue from the analysis, and data. The method 400 may continue with operation 425. In operation 425, the performance analyzer may visually display data and any recommendations the performance analyzer determined. The method 400 may continue to operation 450. In operation 450, the performance analyzer may determine whether the data integration job is still performing. If it is not, then the method 400 may end. If the data integration job is still running, then the method may return to operation 410 to gather more data from the data integration job and analyze it.

Returning to operation 410, if the performance analyzer is in an offline mode, then the method 400 may continue with operation 440. In operation 440, the performance analyzer may receive persistent data of a previously executed job. The persistent data may include the performance data and resource utilization data. In operation 445, the performance analyzer may determine from the persistent data whether there is a performance issue with the past job execution being analyzed. If there is a performance issue, then the method 400 may continue to operation 430. In operation 430, the performance analyzer may analyze the data. In operation 435, the performance analyzer may generate job design recommendations based on the persistent data and rules. The method 400 may continue with operation 425. In operation 425, the performance analyzer may visually display data and any recommendations the performance analyzer determined.

Returning to operation 445, if there is no performance issue with the past job execution, then the method 400 may continue with operation 425. In operation 425, the performance analyzer may visually display data for a user to view. The method 400 may continue to operation 450. In operation 450, the performance analyzer may determine whether the data integration job is still performing. If it is not, then the method 400 may end. If the data integration job is still running, then the method may return to operation 410 to gather more data from the data integration job and analyze it.

Figure 5:
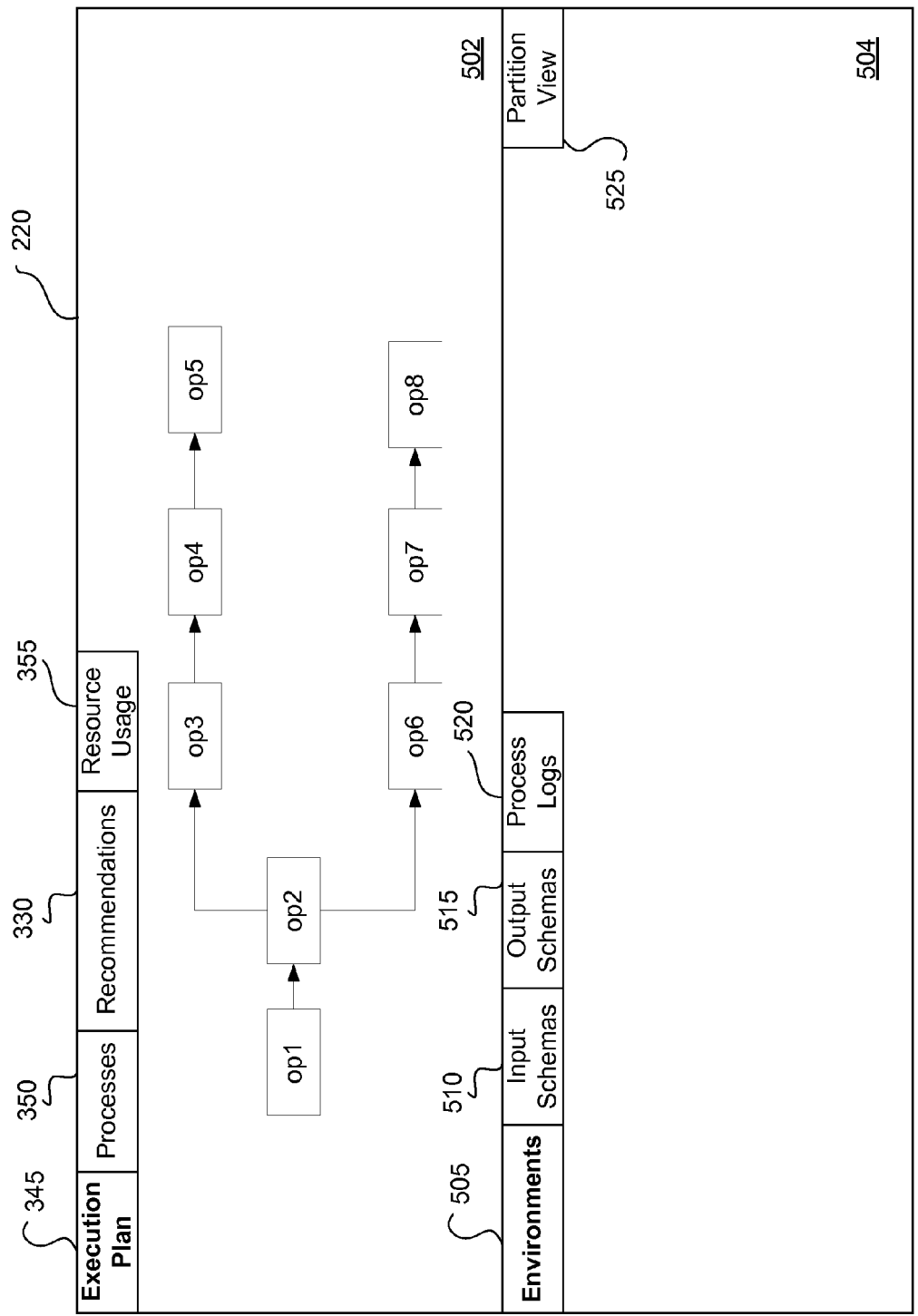
FIG. 5 illustrates an example view of the data integration performance analyzer graphical user interface, according to various embodiments.

FIG. 5 illustrates an example view of the data integration performance analyzer graphical user interface (GUI) 220, according to various embodiments. The GUI 220 may include two sections: a top panel 502 and a bottom panel 504. The top panel 502 may include views of the Execution Plan 345, Processes 350, Recommendations 330, and Resource Usage 355. The bottom panel 504 may include displays of detailed information for the selected views in the top panel 502.

One of the views in the top panel 502 of the GUI 220 may be the Execution Plan 345. The actual job execution plan may be different from the job flow in the design environment. The Execution Plan 345 may illustrate the designed job flow which may be different than the actual job flow. The Processes view 350 may display the actual job flow. There are several factors that may cause the actual job flow to differ from the design job flow. One factor may be partitioning and sort insertion. To satisfy parallel job design semantics, or to avoid hanging process for certain job design patterns (e.g. fork-join pattern), the parallel framework may insert partitions, sort, or buffer operators to the user-specified data flow. Another factor that may cause the actual job flow to differ from the design job flow may be operator combining. Two or more combinable operators may be combined into a single process to improve efficiency and reduce resource usage. Another factor may be composite operators. One single stage operator may be expanded into multiple sub-level operators to implement processing logic. Parallelism is another factor. A parallel stage may have multiple player instances to implement data-partitioned parallelism.

Monitoring top-level design job flow may not provide enough information to understand what has actually happened during the job execution because of the differences between the design job flow and the actual executed job flow. Being able to monitor low-level runtime execution plan to track the performance of each operator of the job while the job is executing may be useful to the user. By selecting the Execution Plan 345, the designed job flow execution may be presented. In embodiments, the Execution Plan 345 may be displayed as a direct acyclic graph where the data flow order is from left to right, e.g. the data source is presented on the left side and the target is presented on the right side.

FIG. 5 illustrates a plurality of operators (op1-op8) that may illustrate the designed job flow of the Execution Plan 345 in the top panel 502. A user may select any operator presented in the graphic representation of the Execution Plan 345. The user may use the graphical representation for monitoring the performance at the partition level. When an operator (op1-op8) is selected, its performance related information may be displayed in the bottom panel 504 on a per partition basis. Some of the information displayed on the bottom panel 504 may include properties of the selected operator. Some of the properties may include the name and ID of the operator, partitioning method, collection method, sort information, and type of operator such as (inserted, composite, and combined). The type of operator may include the operator's effect on the execution plan. Some of the information displayed may be tabbed in the bottom panel 504. One tab may be Environments tab 505 which may contain information on environmental variables. Other tabs may include Input Schemas 510 and Output Schemas 515. These may be one or more tabs and sub-tabs to represent respective input and output links. Each tab or sub-tab may display the schema of the corresponding input link or output link.

A Process Logs tab 520 may also be in the bottom panel 504. The Process Logs tab 520 may display the messages produced by the selected operator. Furthermore, the bottom panel 504 may display a number of job execution statistics. The job execution statistics may include the number of input records consumed, number of output records produced, input throughput, output throughput, CPU utilization, memory utilization, I/O utilization, disk space utilization, and scratch space utilization, for example. The partitions of each operator may be changed with a partition view tab 525. By selecting the partition of an operator, if any, the performance information discussed above may be displayed for the selected partition of the selected operator.

Figure 6:
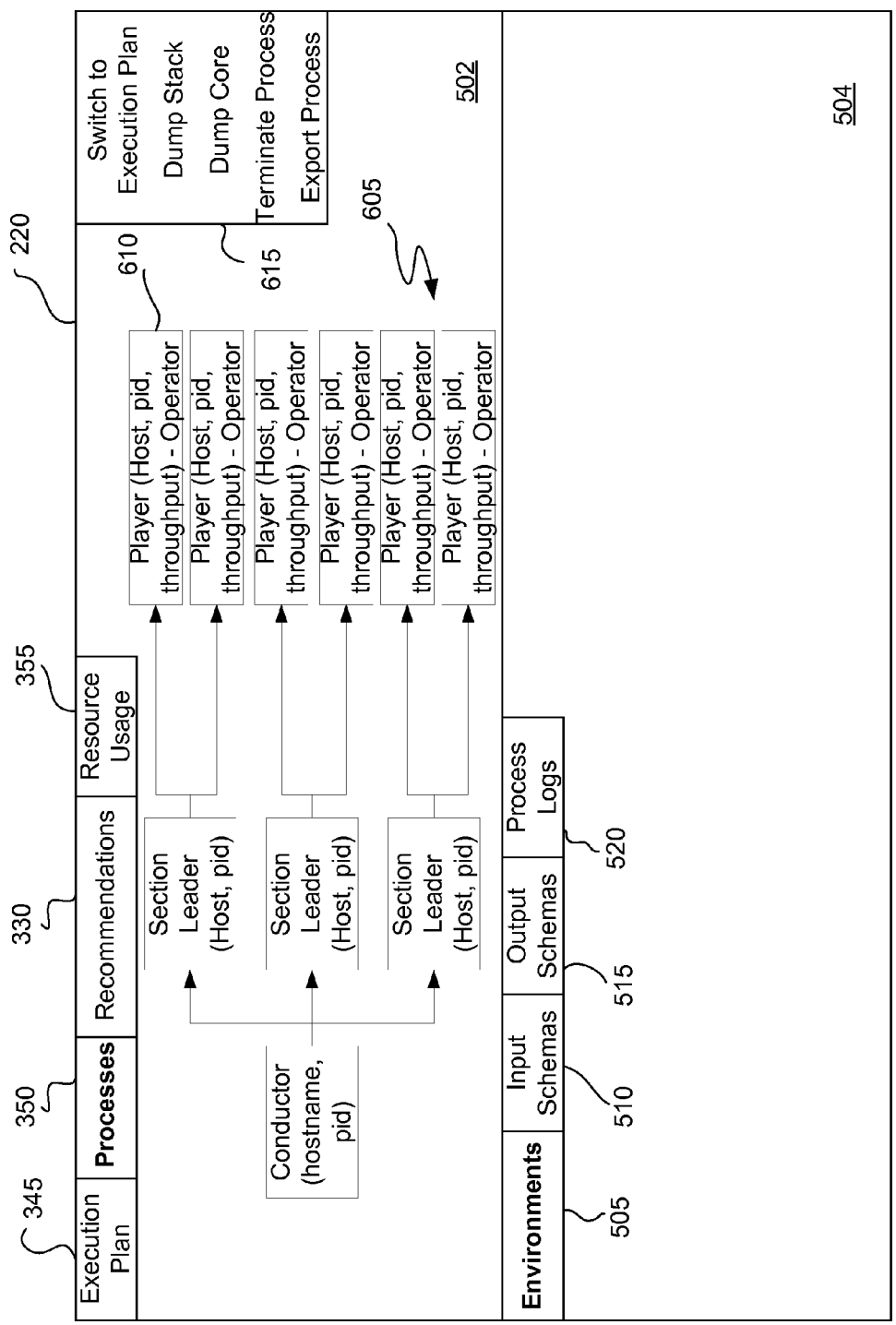
FIG. 6 illustrates another view of the graphical user interface of FIG. 5, according to various embodiments.

FIG. 6 illustrates the Processes view 350 of the GUI 220, according to various embodiments. The Processes view 350 may display the actual job flow instead of the design job flow as in the Execution Plan view 345. The actual job flow may be displayed as, but not limited to, a process tree structure 605 as shown in the top panel 502. The process tree structure 605 may be made of a plurality of process entries, such as process entry 610. The label of each process entry in the process tree structure 605 may include:
Process Type (Host:"hostname", PID:"pid", CPU: "cpu", Memory:"memory", IO:"io") Command line
For example, process entry 610 may be labeled as such:
Player (Host:isdev, PID:5529, CPU:30%, Memory:256 MB, 10:30%) C:\apt\bin\osh –f e98726.osh
In various embodiments, the label may be customizable.

The Process view 350 may also include several other menu items in menu 615. Some of the other items may be, but not limited to, Switch to Execution Plan, Dump Stack, Dump Core, Terminate Process, and Export Process. The Switch to Execution Plan option may allow a user to switch to the operator in the execution plan that correlates to a selected process entry. The Terminate Process option may terminate an executing process. The Export Process option may persist the job process structure into plain text, HTML, or XML files for further analysis.

The Dump Stack option, when selected, may send a signal to an executing process to dump its execution stack. If the executing process is a player process (leaf node), then the Dump Stack option may cause the player process to dump its stack. If the executing process selected is a section leader process, then selecting the Dump Stack option may trigger the section leader plus any children process entries to dump their stacks. If the executing process is the conductor process (root node), the Dump Stack option triggers all of the executing processes associated with the job to dump their stacks.

The Dump Core option, when selected, may send a signal to an executing process to dump its process image. If the executing process is a player process (leaf node), then the Dump Stack option may cause the player process to dump its process image. If the executing process selected is a section leader process, then selecting the Dump Stack option may trigger the section leader plus any children process entries to dump their process images. If the executing process is the conductor process (root node), the Dump Stack option triggers all of the executing processes associated with the job to dump their process images.

By selecting a process entry in the process tree structure 605, the information related to the process entry may be displayed in the bottom panel 504. The information may include environmental variables, input schemas, output schemas, and process logs. Respective Environments tab 505, Input Schemas tab 510, Output Schemas tab 515, and Process Logs tab 520 may allow the user to select the information of the process entry to view. Other information, not limited to the information that is displayed for operators in FIG. 5, could also be displayed for the process entries.

Also illustrated in FIG. 5 and FIG. 6 is an option to select the Recommendations view 330. These recommendations may be called job execution design recommendations, as they can indicate recommended designs for the execution of a particular job. As illustrated in FIG. 3 the performance analyzer 130 may generate a report 325 that contains the recommendations on how to optimize job design for better performance. The performance analyzer 130 may analyze performance results and may provide a set of selective changes for each issue identified. One recommendation may be about flow pattern validation. The performance analyzer 130 may analyze the performance results and correlates those results with the data flow design to help identify potential deadlocks, incorrect fork-join patterns, unnecessary split and merge, unneeded stages, stages that may be simplified or replaced, optimal break-down sub-flows, and use of shared/local containers, for example.

Other sample rules that may be used in making recommendation decisions include: parallel configuration, buffer tuning, partitioning and sort insertion, operator combining, and operator selection. Parallel configuration recommendations include the number of logical and physical partitions, node pools, and node constraints. For a job with a large number of stages, one-node logical node configuration could lead to a large number of processes at runtime. If multiple logical nodes are used, performance could degrade due to resource contention. An optimal design may be to reduce the number of logical partitions and increase the number of physical partition if possible. For a small job that executes across multiple physical partitions, it may be optimal to increase the logical partition and keep all the logical partitions on the same server to minimize data transport across the network.

Buffer tuning such as buffer insertion and parameter settings may be a recommendation. Buffer tuning may help avoid deadlock situations caused by fork-join patterns or remove bottlenecks. Recommendations would let the user know where, why, and how to turn on buffering.

Partitioning and sort insertions may be yet another recommendation, which may include partitioning method consolidation and sort keys decomposition. An example is to partition and sort data upfront at the start of the data flow and keep the partitioned data and sort order up to the point where needed. This may be better than using inconsistent keys through the entire data flow as data has to be repartitioned and sorted wherever keys are changed. Another example is to refine partitioning keys. If data is skewed across partitions for a particular stage, once can consider modifying the keys used to partition the data by adding more keys or picking up different keys that can lead to even data distribution across all of the partitions.

Recommendations may also be made for operator combining. The recommendation may determine whether or not to enable or disable operator combining based on, but not limited to, the number of processes executing on the system, CPU utilization, I/O throughput, and disk space usage. For example, if multiple sort operators are combined to execute in the same process, then only one sort may execute at a time. All other sorts are blocked for receiving more input. It may be optimal to disable sorts if the input data volume is large, so that disk I/O will be better utilized. If input data volume is small, combining sorts would probably be acceptable as sorting is most likely done in memory. Another example may be connectivity operators. If a database operator is combined with upstream processing operators and the database legacy slows down the entire process, then the combination for the database operator may be disabled so upstream processing operators may be impacted less by the database performance.

Another recommendation may be the selection of an operator. It may be important to understand performance characteristics of an operator in terms of CPU, memory, I/O, or disk space utilization. This may help select an operator that can fulfill a specific application need. For example, lookup, join, or merge can all combine data from different streams into one stream, but each operator may have its own performance characteristics. Lookup may work better for small sharable tables. Lookup may also be updatable and range lookup capabilities which join and merger do not have. Join may work well for large size reference table, and merge may work well for multiple tables. Another example may be choosing modify/filter/transform. Using modify or filter may achieve data conversions and constraints which are available in transform, but with less overhead. On the other hand, transform has looping capabilities and more advanced transformation logic. In other examples, users may need to choose between using multiple lookup tables within one lookup versus one lookup table with multiple lookups, and using sequential files over parallel datasets.

To make these recommendations, the performance analyzer 130 may support pluggable rules the performance analyzer may follow when making recommendations. Any stage written in application programming interfaces (API) executing on parallel framework may provide a pre-defined set of rules to inform Performance Analyzer how to make recommendations based on some specific performance data. For example, the rules used to define a bottleneck may be pluggable. On may use the relative throughput or an absolute throughput to define a bottleneck. An absolute throughput is a hard limit such as the number of records per second. By default, there may be a job wide hard limit, any operator whose throughput is below the hard limit may be considered a bottleneck. An operator with specific processing need may override this hard limit by calling a rule API. A relative throughput is throughput in percentage compared to other operators. An example of a rule may be that if the throughput of an operator is 50% less than its producing operator, then this operator may be considered a bottleneck.

Furthermore, in FIG. 5 and FIG. 6 is a Resource Usage view 355. The Resource Usage view 355 may display a number of charts or graphs for, but not limited to, system CPU usage, I/O usage, and memory usage. It may display information collected and analyzed by the performance analyzer 130. The Resource Usage view 355 may be used by the user to evaluate the actual job flow.

Figure 7:
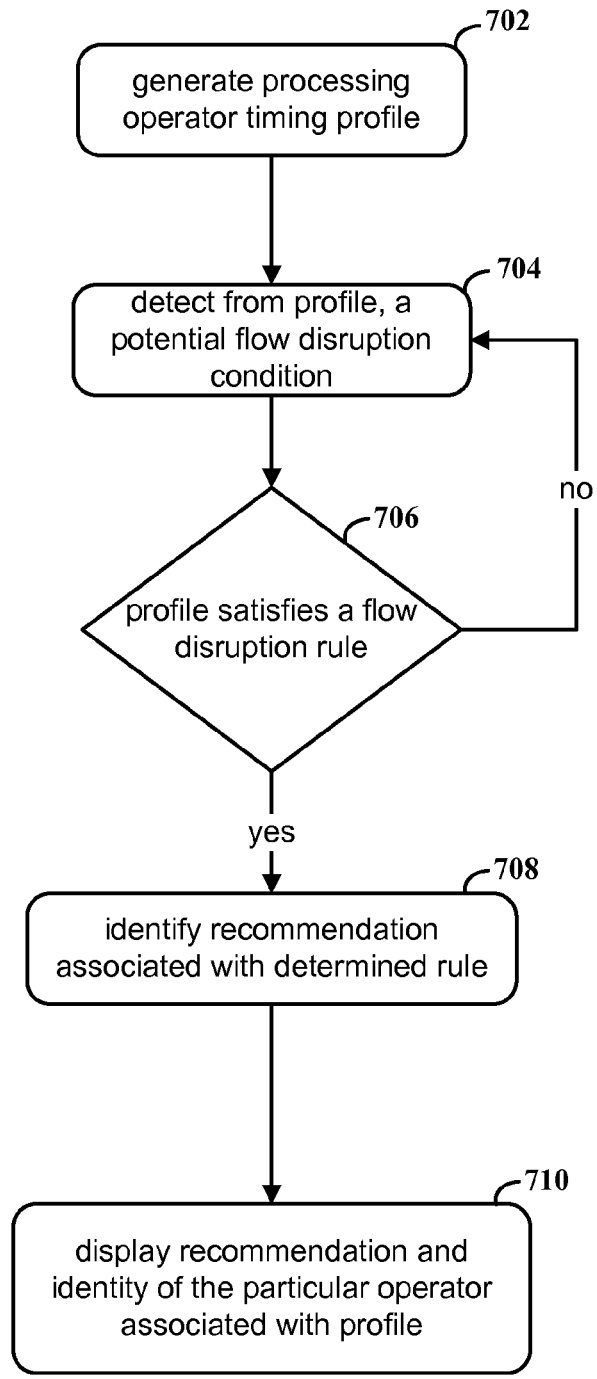
FIG. 7 depicts a flow diagram for detecting data flow disruptions, according to embodiments of the present disclosure.

FIG. 7 depicts a flow diagram for detecting data flow disruptions, according to embodiments of the present disclosure. The data flow disruptions, characterized here as bottlenecks, can be detected from over a series of data processing operators that are each configured to receive and store data in an input record block, and process the data from the input record block. The processing operator can then store the results of the processing on an output record block and output the data from the output record block to the next processing operator in a series. As discussed herein, these operators working in series can be working in a broader parallel execution framework, with many series of operators working parallel. For a particular operator in the series, the system can generate a profile that includes various data points or time stamps pertaining to a processing rate of an operator (i.e. a processing operator timing profile), per 702. A processing operator timing profile can be generated for each operator in a series.

A processing operator timing profile can include an input wait time which indicates the amount of time a processing operator is waiting to receive an input record. Specifically, the input wait time is based on the amount of time a particular data set is stored in a particular input data record. For example, a particular operator "M" may receive a particular data set "D" from the upstream operator "M−1" in the series of operators. The particular data set was written by the M−1 operator onto the M−1's output data record block. This same record block can be received as operator M's input record block. The input wait time indicates the period of time that particular input record block existed (and stored the particular data set).

The profile can also include an operator processing time which is determined based upon a period of time between the start of the processing of the particular data set and the completion of the processing by the particular processing operator.

The profile can also include an output wait time which indicates the amount of time an output record block stores a particular set of data, from when it is written by the particular processing operator onto the output data block to when it is received, as an input data block, by the next operator. Specifically, the output wait time can be based upon the period of time that a particular data set is stored in a particular output data record block. For example, the particular operator M referred to above may process a particular data set D and write the data set D to a particular output record. The output record can be sent downstream to a next operator in the series "M+1". This output data record block from operator M can be received as an input record block at M+1. The period of time that the data is stored on the output data record block can be the output wait time.

Per 704, the system can monitor the processing operator timing profiles to detect a potential flow disruption condition within the profiles for a particular processing operator. Per 706, the profile can be compared to a set of flow disruption rules and the system can determine that the statistics that comprise the profile satisfy at least one rule from the set of flow disruption rules. Each rule in the set of flow disruption rules can correspond to at least one recommendation. If the system determines that the profile does not satisfy any of the flow disruption rules at 706, the system will continue to monitor the profiles to detect a potential flow disruption condition, per 704.

Using the determined flow disruption rule that is satisfied by the profile data, at 706, the system can identify the recommendation associated with the rule, per 708. Examples of rules are provided herein. As the different rules pertain to different causes of the flow disruption or "bottleneck", each recommendation is purposed to address the bottleneck, based on the satisfied rule, in order to diagnose and treat the bottlenecks. The system can then display the recommendation and the identity of the particular operator associated with the profile that satisfied the potential flow disruption condition, per 710.

Figure 8:
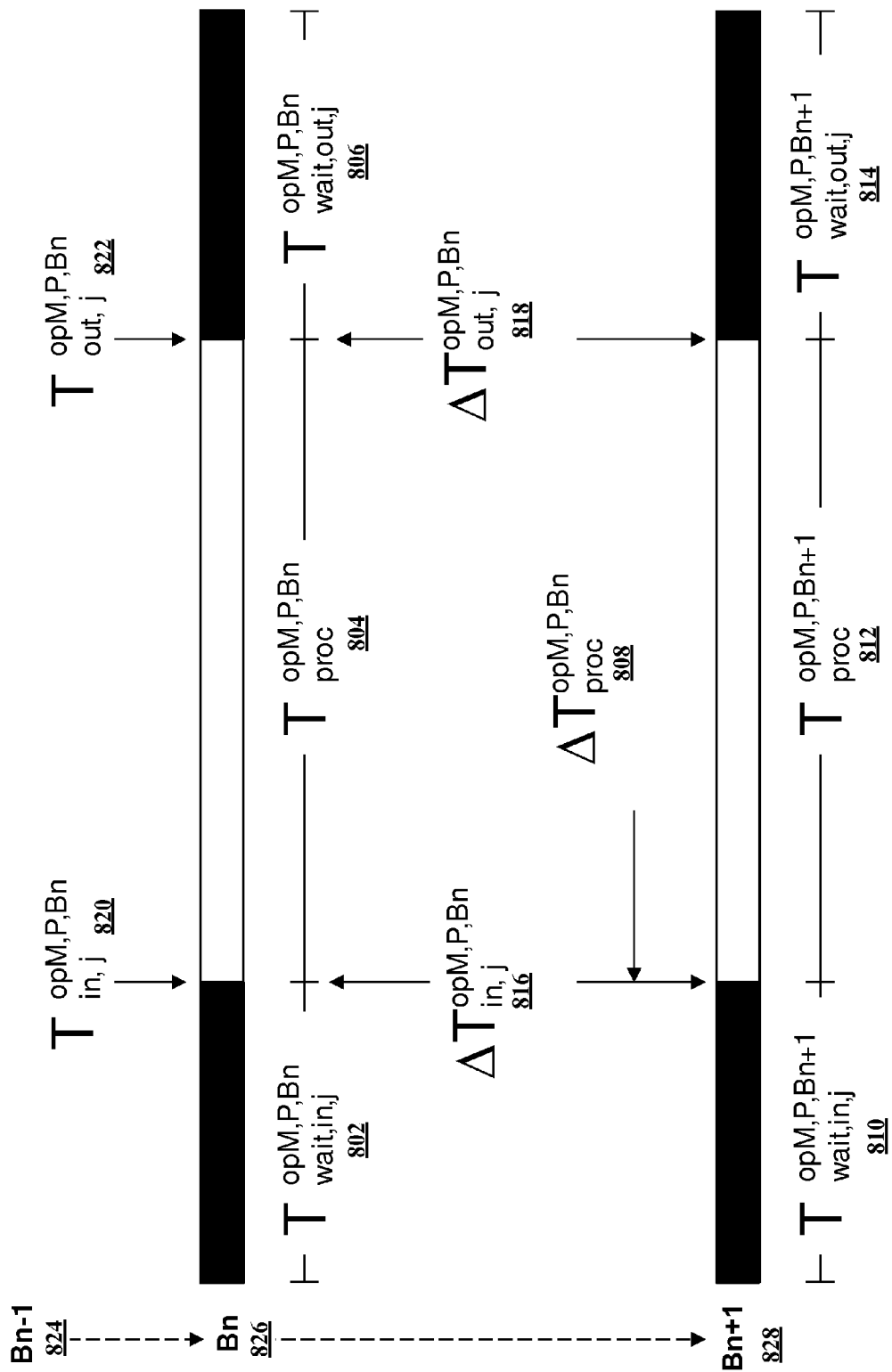
FIG. 8 depicts a diagram of record block processing over time, according to embodiments of the present disclosure.

FIG. 8 depicts a diagram of record block processing over time, according to embodiments of the present disclosure. The location of various data points or statistics that may be collected to build a processing operator timing profile for each processor have been identified on the figure. Thus, understanding the various points along the processing of Table 1 contains a key for some of the symbols used in FIG. 8, both what each data point represents and for some, how it was derived.

TABLE 1

| | |
|---|---|
| $T_{link,j}^{opM,P,Bn}$ | time when block Bn arrives at I/O link j on partition P of operator M |
| $T_{proc}^{opM,P,Bn}$ | processing time of block Bn on partition P of operator M. |
| $T_{proc}^{opM,P,Bn} = T_{out,max}^{opM,P,Bn} - T_{in,min}^{opM,P,Bn}$ | |
| $T_{out,max}^{opM,P,Bn} = \max(T_{out,0}^{opM,P,Bn}, T_{out,1}^{opM,P,Bn}, T_{out,j}^{opM,P,Bn} \ldots T_{out,N}^{opM,P,Bn})$ | |
| $T_{in,min}^{opM,P,Bn} = \min(T_{in,0}^{opM,P,Bn}, T_{in,1}^{opM,P,Bn}, T_{in,j}^{opM,P,Bn} \ldots T_{in,N}^{opM,P,Bn})$ | |
| $\Delta T_{proc}^{opM,P,Bn}$ | time interval between processing block Bn and block Bn − 1 of operator M on partition P |
| $\Delta T_{proc}^{opM,P,Bn} = T_{proc}^{opM,P,Bn} - T_{proc}^{opM,P,Bn-1}$ | |
| $T_{wait,link,j}^{opM,P,Bn}$ | wait time of the I/O link j for block Bn becoming consumable on partition P |
| $T_{wait,in,j}^{opM,P,Bn}$ | wait time between when the operator M has transported the output record block Bn − 1 and the time when the next input record block Bn arrives on input link j on partition P |
| $T_{wait,out,j}^{opM,P,Bn}$ | wait time between when the operator M is ready to transport output record Bn and the time when the downstream operator M + 1 starts consuming the output record block Bn on partition P |
| $T_{wait,in,j}^{opM,P,Bn} = T_{in,j}^{opM,P,Bn} - T_{out,min}^{opM,P,Bn-1}$ | |
| $T_{wait,out,j}^{opM,P,Bn} = T_{in,max}^{opM+1,P,Bn} - T_{out,j}^{opM,P,Bn}$ | |
| $\Delta T_{link,j}^{opM,P,Bn}$ | time between block Bn − 1 and block Bn's arrival at I/O link j on partition P of operator M |
| $\Delta T_{in,j}^{opM,P,Bn} = T_{in,j}^{opM,P,Bn} - T_{in,j}^{opM,P,Bn-1} = T_{proc}^{opM,P,Bn} + T_{wait,out,j}^{opM,P,Bn} + T_{wait,in,j}^{opM,P,Bn}$ | |

FIG. 8 can be understood to indicate key data points along during the processing of data blocks over a particular operator (opM). These key data points can be aggregated to comprise part or all of the timing profile for each processing operator. The figure depicts the processing of data blocks Bn−1 824, Bn 826, through Bn+1 828, as indicated on the left in FIG. 8. For data block Bn 826, a first metric 802 $T_{wait,in,j}^{opM,P,Bn}$ can be collected, which represents the wait time between when the operator M has transported the output record block Bn−1 824 and the time when the next input record block Bn 826 arrives at input link j on partition P. A second metric 804 $T_{proc}^{opM,P,Bn}$ represents the processing time of block Bn 826 on partition P of operator M. This processing time can include the time spent on setting up the input buffer, running operator processing logic, and linearizing the output buffer. Another metric, 806 $T_{wait,out,j}^{opM,P,Bn}$ represents the wait time between when the operator M is ready to transport the output record block Bn and the time when the downstream operator M+1 starts consuming the output record block Bn on partition P.

Similarly, 810 $T_{wait,in,j}^{opM,P,Bn+1}$ can be monitored, which represents the wait time between when the operator M has transported the output record block Bn 826 and the time when the next input record block Bn+1 828 arrives at input link j on partition P. 812 $T_{proc}^{opM,P,Bn+1}$ represents the processing time of block Bn+1 828 on partition P of operator M. Again, this can include the time spent on setting up the input buffer, running operator processing logic, and linearizing the output buffer. 814 $T_{wait,out,j}^{opM,P,Bn+1}$ can represent the wait time between when the operator M is ready to transport output record block Bn+1 828 and the time when the downstream operator M+1 starts consuming the output record block Bn+1 828 on partition P. Other exemplar data points or time stamps that can be collected include 820 $T_{in,j}^{opM,P,Bn}$, 822 $T_{out,j}^{opM,P,Bn}$, 808 $\Delta T_{proc}^{opM,P,Bn}$ which is the change in processing time of partition P of opM from Bn to Bn+1, 816 in, $\Delta T_{in,j}^{opM,P,Bn}$, which is the time interval between wait (in) cycles of partition P of opM, and 818 out, $\Delta T_{out,j}^{opM,P,Bn}$, which is the time interval between wait (out) cycles of partition P of opM.

The data points or time stamps described herein (e.g. TABLE 1, FIG. 8-9) can be used to detect the existence of a potential or actual bottleneck. A bottleneck can be identified if particular data points satisfy one or more bottleneck rules. Other rules can use the collected time stamps and calculated deltas to determine the absence of a bottleneck or a potential bottleneck. Examples of the rules are listed in TABLE 2.

TABLE 2

1. No change or change within allowed threshold for $\Delta T_{in,j}^{opM,P,Bn}$, then no bottleneck.
2. Changes exceed the allowed threshold for $\Delta T_{in,j}^{opM,P,Bn}$
   Find maximum input I/O elapsed time among all partitions:
   $\Delta T_{in,max}^{opK,P,Bn} = \max(\Delta T_{in,j}^{op0,P,Bn}, \Delta T_{in,j}^{op1,P,Bn}, \Delta T_{in,j}^{opK,P,Bn} \ldots \Delta T_{in,j}^{opM,P,Bn})$
   Check $\Delta T_{proc}^{opK,P,Bn} \Delta T_{wait,out,j}^{opK,P,Bn} \Delta T_{wait,in,j}^{opK,P,Bn}$ of operator K to see whether or not the operator is waiting longer on output, input or processing records.
3. If $\Delta T_{proc}^{opK,P,Bn}$ is much larger and causes increase in input I/O, find maximum processing time:
   $T_{proc}^{opL,P,Bn} = \max(T_{proc}^{op1,P,Bn}, T_{proc}^{op2,P,Bn}, T_{proc}^{opL,P,Bn} \ldots T_{proc}^{opM,P,Bn})$
   If $T_{proc}^{opL,P,Bn} = T_{proc}^{opK,P,Bn}$ mark operator K as a potential bottleneck. If this is still true after Q blocks, then operator K becomes the bottleneck. Otherwise, operator L is a potential bottleneck. Monitor its upstream and downstream operators more closely.
4. If $\Delta T_{wait,out,j}^{opK,P,Bn}$ is much larger and causes increase in output I/O, find maximum output I/O wait time:
   $T_{wait,out,j}^{opL,P,Bn} = \max(T_{wait,out,j}^{op1,P,Bn}, T_{Wait,out,j}^{op2,P,Bn}, T_{wait,out,j}^{opL,P,Bn} \ldots T_{wait,out,j}^{opM,P,Bn})$
   If $T_{wait,out,j}^{opL,P,Bn} = T_{wait,out,j}^{opK,P,Bn}$
   Repeat steps 2 and 3 among all the operators downstream of operator K. If operator R downstream of opertaor K has the most processing time for over Q blocks, operator R becomes the bottleneck.
5. If $\Delta T_{wait,in,j}^{opK,P,Bn}$ is much larger and causes increase in input I/O, find maximum input I/O wait time:
   $T_{wait,in,j}^{opL,P,Bn} = \max(T_{wait,in,j}^{op1,P,Bn}, T_{Wait,in,j}^{op2,P,Bn}, T_{wait,in,j}^{opL,P,Bn} \ldots T_{wait,in,j}^{opM,P,Bn})$
   If $T_{wait,in,j}^{opL,P,Bn} = T_{wait,in,j}^{opK,P,Bn}$
   Repeat steps 2 and 3 among all the operators upstream of operator K. If operator R upstream of operator K has the most processing time for over Q blocks, operator R becomes the bottleneck.
6. If there are multiple links (for example input/output links) experiencing long I/O time, examine each link with rules 4 and 5. If all these links connect to the same operator G, then operator G is a potential bottleneck. Keep track of operator G for Q subsequent blocks to confirm.
7. In some situations, a link may experience long I/O time due to lack of records coming down this link. For example, a reject link where there are not many reject records; an output link from filter, transform, or switch where not many records meet the constraint applied to that link. In this case, extend rule 5 to see if the upstream operator has transported any record blocks to other downstream operators. If so, mark the long I/O time on this link as expected.
8. In other situations, there might be multiple operators that are identified as potential bottlenecks as a result of rule 3. It is possible that none will become a true bottleneck, or it is also possible that one or more become a true bottleneck. When a bottleneck occurs, data processing speed tends to follow that defined by the bottleneck operator. Using I/O time collected during job run, the operator that defines the data processing speed of the data flow can be identified.
9. For an operator with multiple input links, if the input pattern used by the operator is not non-deterministic, meaning the operator reads data from input links in a certain order, it is likely all the links may exhibit high I/O time, but only one link is blocked by a bottleneck upstream, and this link blocks other input links. In this case, first the blocking input link that is waiting on an input record block is identified; other links should be waiting on this record block to be consumed. Once the blocking input link is identified, rule 5 can be applied to identify the bottleneck. If there are multiple blocking input links, rule 9 is repeated to identify the bottleneck following each input link.

TABLE 2-continued

10 Similar to rule 9, for an operator with multiple output links, if the output pattern used by the operator is not non-deterministic, meaning the operator writes data to output links in a certain order, it is likely all the links may exhibit high I/O time, but only one link is blocked by a bottleneck downstream, and this link blocks other output links. In this case, first the blocking output link that is the first among all output links waiting on output record block to be consumed is identified. Once the blocking output link is identified, rule 4 can be used to identify the bottleneck. If there are multiple blocking output links, rule 10 can be repeated to identify the bottleneck following each output link.

Figure 9:
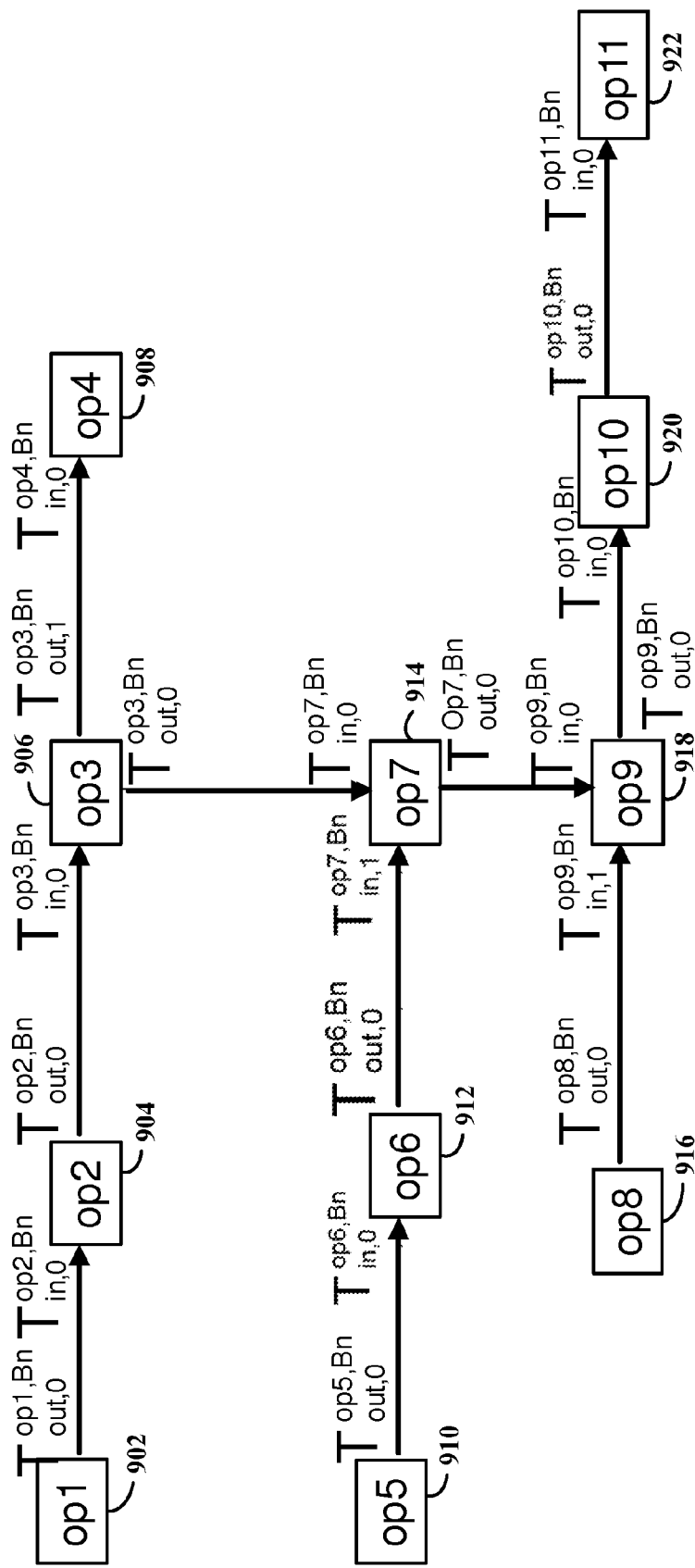
FIG. 9 depicts a diagram of data points collected along a series of processing operators, according to embodiments of the present disclosure.

FIG. 9 depicts a diagram of data points collected along a series of processing operators, according to embodiments of the present disclosure. The diagram depicts a series of operators, with multiple series working in parallel. The operators 902-922 may process data. In this example, each processing operator can have a unique identity and role. For example, op1 902 could be a connecting operator to a database or sources (for example a DB2 connector, for connecting to a particular database software DB2). Op1 902 could read data from a remote DB2 server. Op2 904 could be a column generator, purposed to generate an additional key column. Op3 906 could be a transformer, which could apply transformation on data from DB2. Op4 908 could be a sequential file for export, which could save rejected records to a file. Op5 910 could be a sequential file for import, which could read data from a file. Op7 914 could be a lookup operator and combine records incoming from op3 906 and op6 912. Op8 916 can be a dataset import operator, which can read data from parallel datasets. Op9 918 can be a "join" operator, which can combine data records being output by op8 914 and op8 916. Op10 920 can remove duplicate records, and op11 can be another DB2 connector, and write data back to a remote DB2 server.

The data can be received as an incoming record block and the data can be output by the processor writing the output data on an output record block. At each input and output point, a time stamp or data point is collected, as indicated by the T symbol in the figure. For example, op1 902 may write the processed data on an output record block, and mark that time $T_{out,0}^{op1,Bn}$, to signify the time the output block Bn was written by op1 902. Another time stamp $T_{in,0}^{op2,Bn}$ can be collected when the record block Bn arrives as an input to op2 904. A time stamp can be collected in a similar manner at two points in each operator linkage. Thus, when identifying a bottleneck, the system can compare the difference between the output at a first operator and the input at a second operator, in order to determine whether a delay in the communication between processors is a source of a detected potential bottleneck (versus, for example, a processing delay at the first or second operator).

Examples of the rules in Table 2 can be applied over the operators in FIG. 9. The rules could apply to a number of other operators processing data in a series, using the rules in Table 2 or other rules, as described herein. For example, a bottleneck at op1 902 can be detected in the following scenario:

$\Delta T_{in,0}^{op2,P,Bn}$ keeps increasing and becomes the maximum input I/O time. However, $\Delta T_{proc}^{op2,P,Bn}$ and $\Delta T_{wait,out,0}^{op2,P,Bn}$ are both negligible, and $\Delta T_{wait,in,0}^{op2,P,Bn}$ increases noticeably. The application of rule 5 (i.e. from Table 2) finds that $\Delta T_{proc}^{op1,P,Bn}$ increases significantly over a set of blocks. This can indicate that op1 902 is a bottleneck.

In the scenario described above, the system could make a particular recommendation. For example, this recommendation could be selected in response to the particular rule satisfied by the data, which resulted in the bottleneck detection. For example, in response to the detection of a bottleneck at op1 902, satisfied by rule 5, the system could make the following recommendation: decrease the buffer size so the source stage can transmit records more frequently to reduce waiting time of other operators down the pipeline.

Another scenario could include a bottleneck at op11 922 as detected using rule 4 (from Table 2). In this scenario, $\Delta T_{in,0}^{op10,P,Bn}$ increases and continues to increase and become the maximum input I/O time. However, $\Delta T_{proc}^{op10,P,Bn}$ and $\Delta T_{wait,in,0}^{op10,P,Bn}$ are negligible, and $\Delta T_{wait,out,0}^{op10,P,Bn}$ increases noticeably. The application of rule 4 (i.e. from Table 2) finds that $\Delta T_{proc}^{op11,P,Bn}$ increases significantly over a set of blocks. Thus, a bottleneck at op11 922 is indicated.

In response to this scenario, the system can make a particular recommendation. The system can recommend to increase the buffer size, so it takes more processing time upstream of the target stage which reduces the chance of records piling up for a particular target to consume.

Another scenario involves identifying a bottleneck at a joining stage, where there may be inputs from multiple operators. In this scenario, input data to join needs to be sorted, and sorting may be slowing processing down. Time increase is observed for the following parameters:
$\Delta T_{in,0}^{op10,P,Bn}$ $\Delta T_{wait,in,0}^{op10,P,Bn}$ $\Delta T_{in,0}^{op9,P,Bn}$
$\Delta T_{wait,in,0}^{op9,P,Bn}$ $\Delta T_{in,1}^{op9,P,Bn}$ $\Delta T_{wait,in,1}^{op3,P,Bn}$ Tsort can be used at the input links of op9 918. Tsort is a command line that can perform a topological sort on its input. For example, it can provide for the ordering of object files to allow the linker to process them sequentially (each one exactly once and in order). Tsort can serve as a buffer so no increased I/O time is observed on other operators upstream of the inserted tsorts. Rule 5 can be applied to the input link 0 and input link 1, and tsorts is identified as a bottleneck. This is because tsort needs to access the disk, and there might be disk I/O issues causing the performance degradation. In response to this particular scenario, the system could recommend the followings solution: increase buffer size to reduce the overhead caused by disk I/O.

Figure 10:
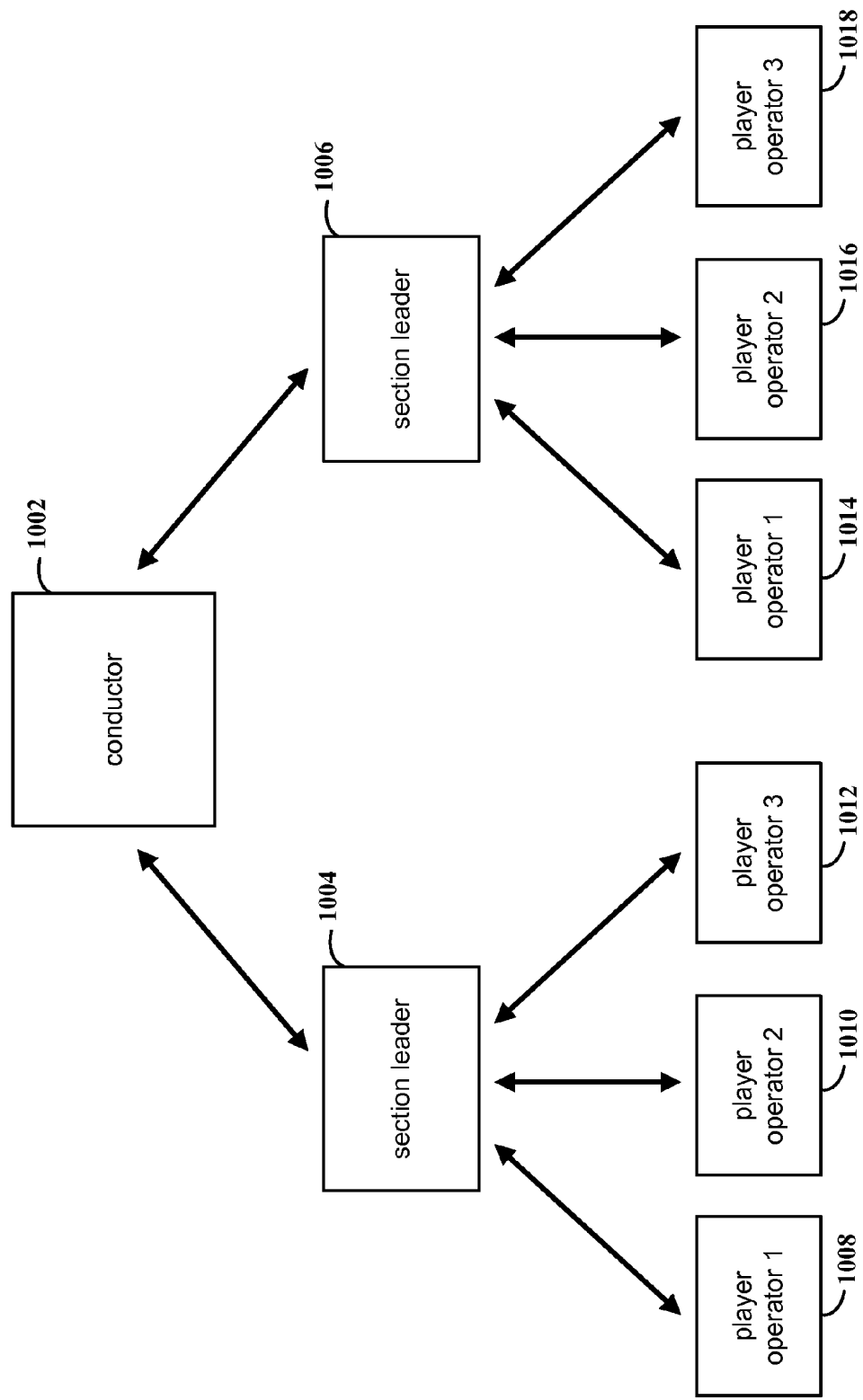
FIG. 10 depicts a diagram of a parallel execution framework, according to embodiments of the present disclosure.

FIG. 10 depicts a diagram of a parallel execution framework, according to embodiments of the present disclosure. This figure can be used to provide context to the process in FIGS. 11-13. The disclosed may be implemented in a parallel execution framework, as disclosed herein. Computation progress can be supervised by a chosen server, the conductor process 1002. The conductor process 1002 can be responsible for the orderly creation and shutdown of a job and the consolidation of job log messages from the collection of processes that make up that job. The player processes 1008-1018 are the stages that do the work on the job, and these processes therefore drive the majority of the server load. The conductor process 1002 can create the section leader processes 1004 and 1006. The number of parallel execution servers (i.e. section leader processes) associated with a single operation can be identified as the degree of parallelism. Here a system with two degrees of parallelism is shown. Each section leader 1004 and 1006 can create and manage player processes or "operators" 1008-1018. These player operators can be the operators referred to herein, e.g. in FIGS. 8-9. Each player operator (each of 1008-1018) is a group of processes used to execute framework operator logic. As the player operator is created by the section leader, the player operators can be created on the same system as their section leader process. For example, section leader 1004 can create and manage player operators 1-3, 1008-1012, and section leader 1006 can create and manage player operators 1014-1018. The section leaders 1004 and 1006 can also manage communication between the player operators 1008-1012 and 1014-1018, respectively and the conductor process 1002. The terms in this figure are used in FIGS. 11-13, for describing examples of how the disclosed can be implemented in a parallel execution framework, for example.

Figure 11:
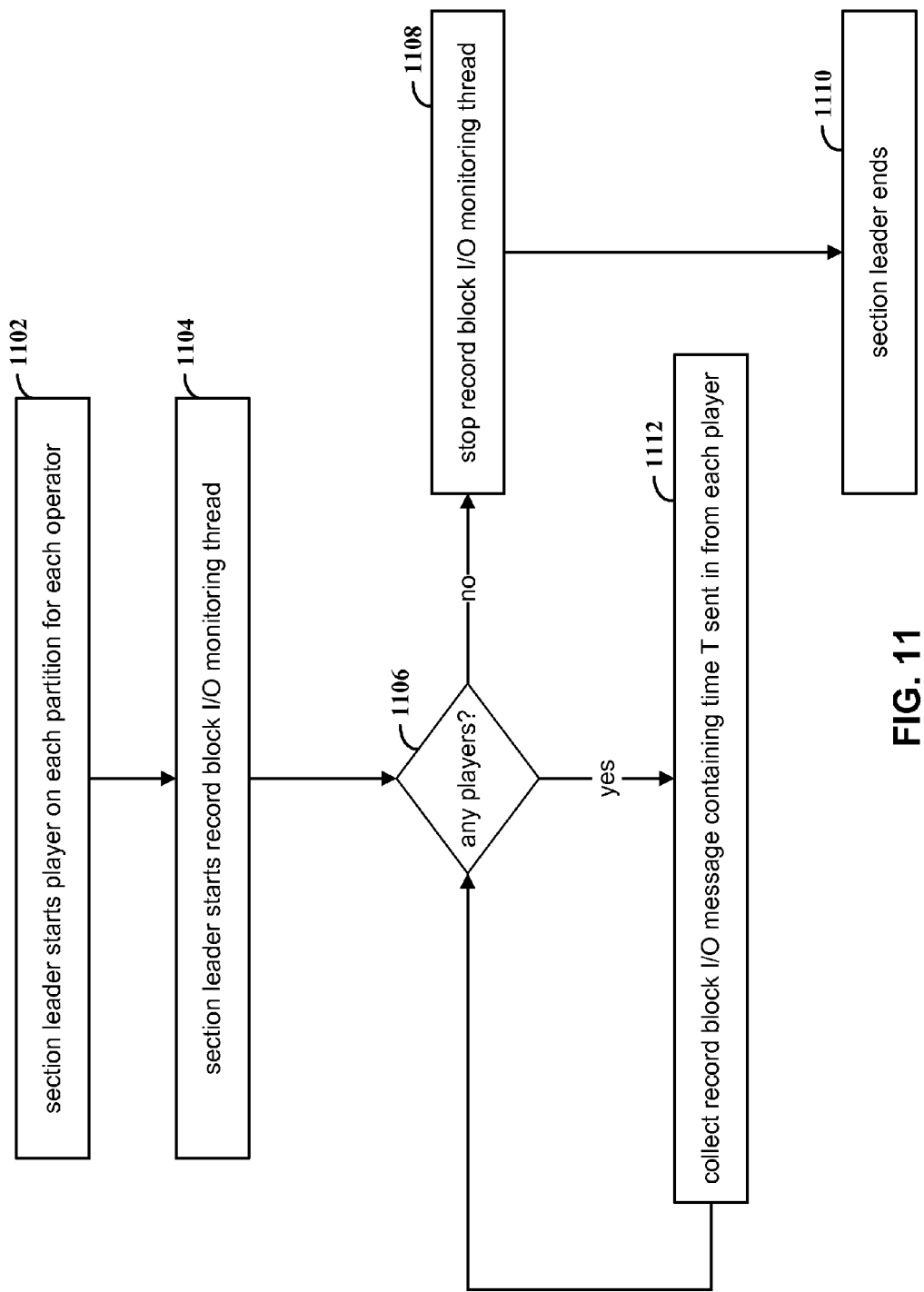
FIG. 11 depicts a flow diagram of the implementation of a bottleneck detection and correction mechanism into a parallel execution framework from a section leader process perspective, according to embodiments of the present disclosure.

FIG. 11 depicts a flow diagram of the implementation of a bottleneck detection and correction mechanism into a parallel execution framework from a section leader process perspective, according to embodiments of the present disclosure. The section leader process referred to can be understood as one of the section leaders 1004 or 1006 in FIG. 10, and the "players" can be considered to be one or more of the player operators (1008-1018) in FIG. 10. Player operators in this framework can be the operators referred to herein. The implementation can begin when a section leader starts a player on each partition for each operator, per 1102. This can be understood as the section leader beginning the thread for each player. The section leader can then start a record block input/output (I/O) monitoring thread, per 1104. At this point, the system checks if there are any players, per 1106. If a job is still running, then the players working on the job will be present and active. If the job has been completed or the player is no longer active, the player will be deleted and no longer present. At 1106, if no players exists (for example because the job has completed), the system will stop the record block I/O monitoring thread, per 1108, and the section leader will end, per 1110. If, however, active players are detected at 1106, the system can collect the record block I/O message containing time T sent in from each player. In this way, the system can collect the various times, or data points or time stamps, T (as detailed herein), per 1112.

Figure 12:
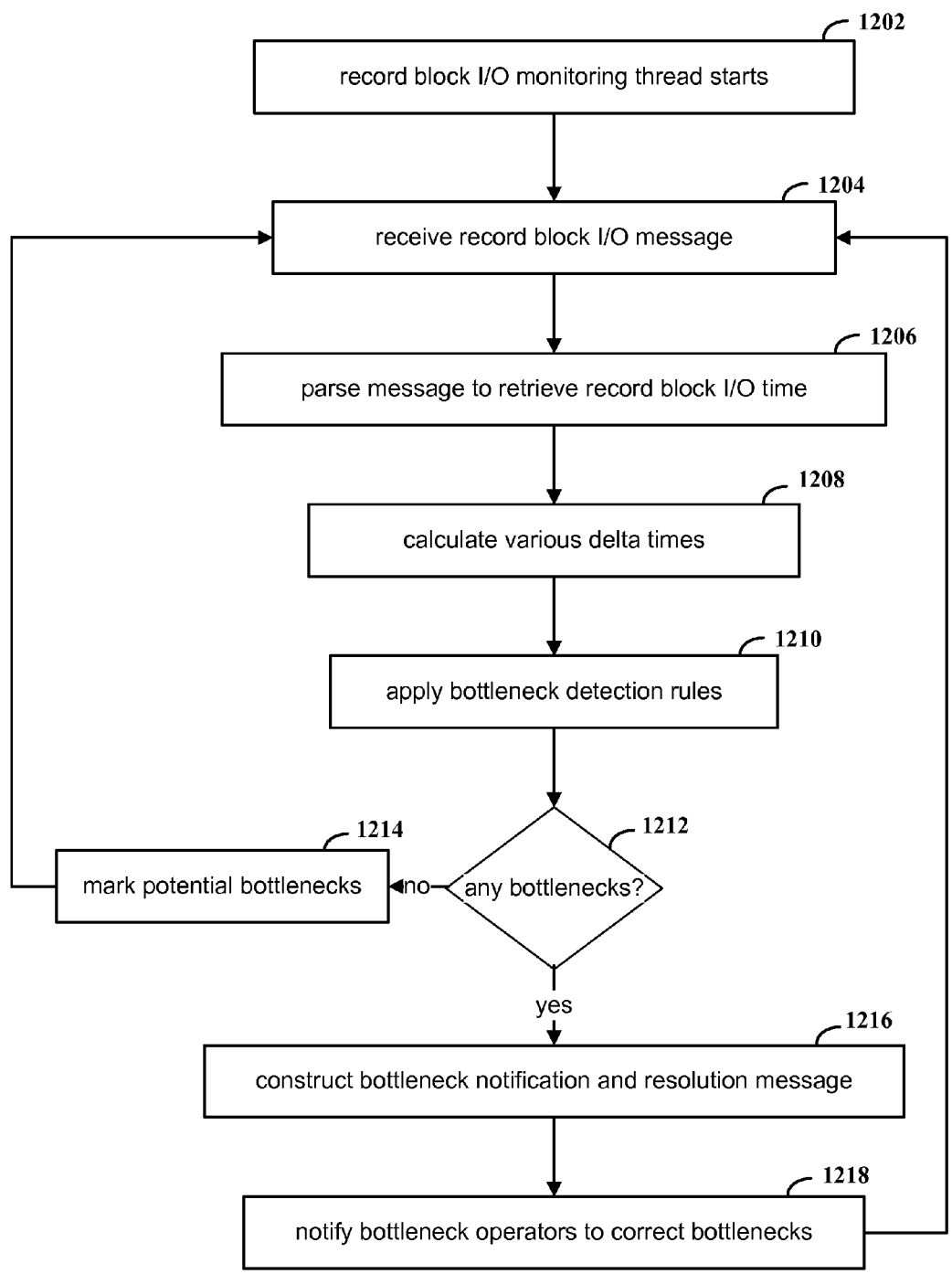
FIG. 12 depicts a flow diagram for detecting data flow disruptions over a series of data processing operators, according to embodiments of the present disclosure.

FIG. 12 depicts a flow diagram for detecting data flow disruptions over a series of data processing operators, according to embodiments of the present disclosure. The monitoring thread discussed herein can be the monitoring thread that was begun at 1104. The monitoring thread and the process described herein can be implemented into a parallel processing framework as depicted in FIG. 10. Here, a record block I/O monitoring thread starts, per 1202. The system can receive a record block I/O message, per 1204 from for example, one of the player operators. The system can parse the message to retrieve a record block I/O time, per 1206. Using the data contained in the message, the system can calculate various delta times, per 1208. These delta times can be those described herein (e.g. in Table 1) including $\Delta T_{proc}^{opM,P,Bn}$, $\Delta T_{link,j}^{opM,P,Bn}$, or others. Using the various time stamps parsed from the message, the system can apply bottleneck detection rules, per 1210. For example, these bottleneck rules can be those disclosed herein (e.g. Table 2) or other rules. Based on the application of the bottleneck rules, the system can determine if a bottleneck exists, per 1212, by determining if one or more of the bottleneck detection rules are satisfied by the times received via the message. If a bottleneck is detected, the system can construct bottleneck notification and resolution messages, per 1216, and notify bottleneck operators to correct bottlenecks, per 1218. These resolution messages can be the recommendations described herein. The system can also display this information to a user, in order to provide for manual correction, based on settings. Upon the notification of bottleneck operators, per 1218, the system can receive a record block I/O message, per 1204, and flow through the process. Once potential bottlenecks have been marked for monitoring, per 1214, and no bottlenecks have been detected, the system can return to block 1204 and receive a record block I/O message, and continue through the flow.

Depending on a system's settings, detected bottlenecks may be corrected automatically or manually by a user. For example, a system's settings could implement the provided recommendation automatically, upon receipt of said recommendation. In this case, the bottleneck, the recommendation, and the resulting corrected flow rate could all be displayed for a user to monitor on a user interface, for example as part of a performance management system. In some cases, there could be an override option, so the user could implement a change other than the one recommended. In other cases, the recommendation would be displayed for a user, without implementation, and the user would need to manually select the recommendation's implementation.

Figure 13:
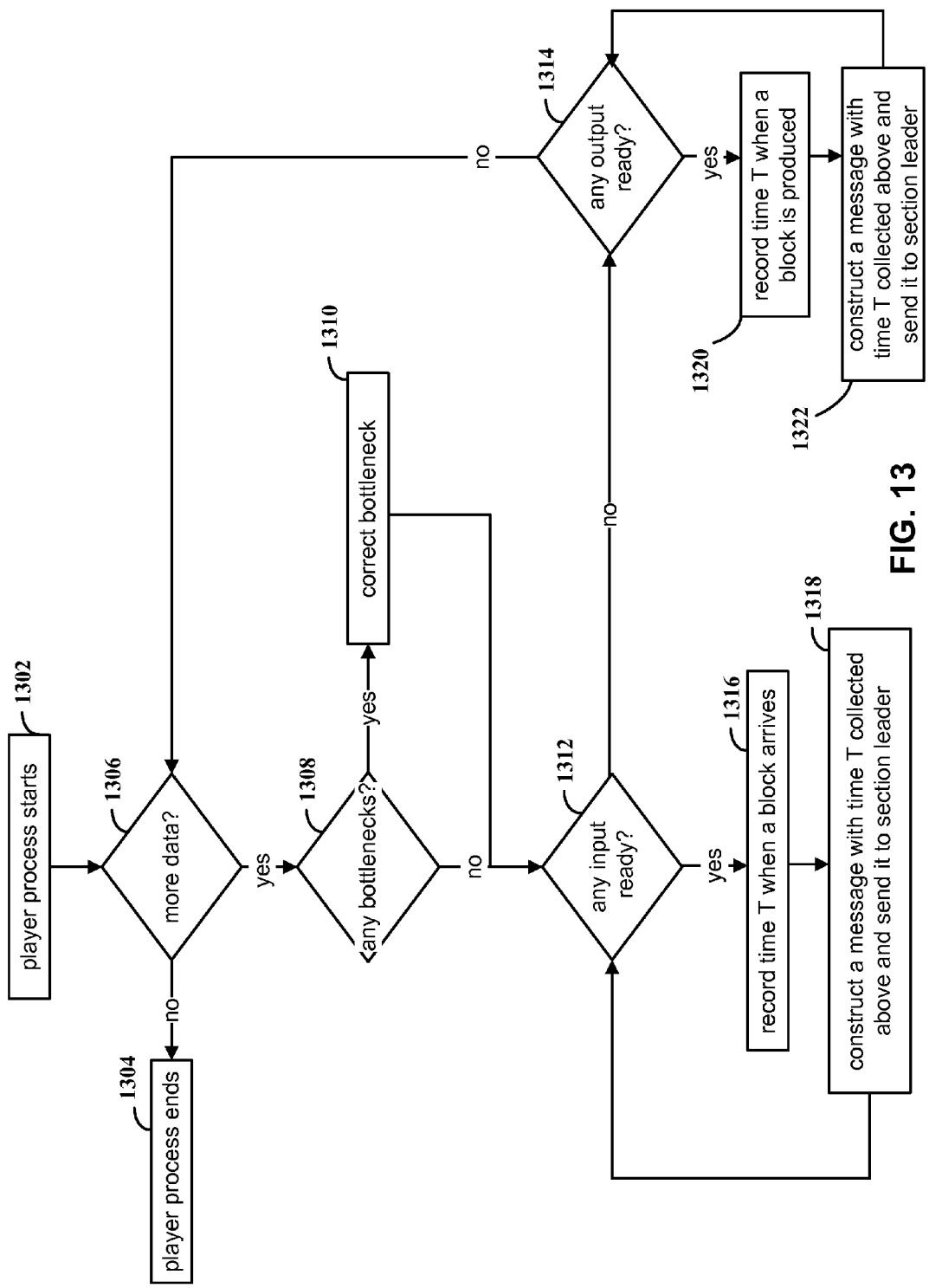
FIG. 13 depicts a flow diagram of the implementation of a bottleneck detection and correction mechanism into a parallel execution framework from a player process perspective, according to embodiments of the present disclosure.

FIG. 13 depicts flow diagram of the implementation of a bottleneck detection and correction mechanism into a parallel execution framework from a player process perspective, according to embodiments of the present disclosure. The flow depicted in FIG. 13 illustrates an example of how the system can collect data points or time stamps and create a message to provide to the section leader, as described herein (e.g. in FIGS. 11 and 12). In this example, a player processor can be considered the operator, as the processor is receiving, processing, and outputting data. The flow can begin at 1302, when a player process starts. This player process may be the same as any one of the player operators 1008-1018 of FIG. 10, or others. The player process determines whether there is more data, per 1306, in order to continue processing. If no more data is available, the player process ends, per 1304, and the player will be deleted. If more data is located at 1306, the system will monitor to see if any bottlenecks are detected, per 1308. If a bottleneck is detected, the system can correct the bottleneck, per 1310, and monitor for input, per 1312. In this example, a bottleneck can be detecting using the example rules disclosed herein. If no bottleneck is detected at 1308, the system can monitor for input ready to be processed, per 1312.

If input is detected at 1312, the system can record time T when a block arrives, per 1316. The system can then construct a message with time T collected at 1316 and send it to the appropriate section leader (i.e. the section leader that created and is managing the relevant player process), per 1318. The system can again monitor for any input that is ready to be processed, per 1312. If no input is ready at 1312, the system can detect if any output is ready for processing, per 1314. If output is ready, the time stamp T after a block is produced can be recorded, per 1320, and a message can be constructed with the time stamp T collected at 1320. Per 1322, the message with the collected time stamp can be sent to the appropriate section leader (as above). The system can then monitor for any output that is ready to be processed, per 1314. If no output is ready, the process can restart and monitor for more data, per 1306. In this way, the system can gather data points or time stamps, like those described herein, to be used in bottleneck detection.

Referring back to FIG. 1, embodiments may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 14:
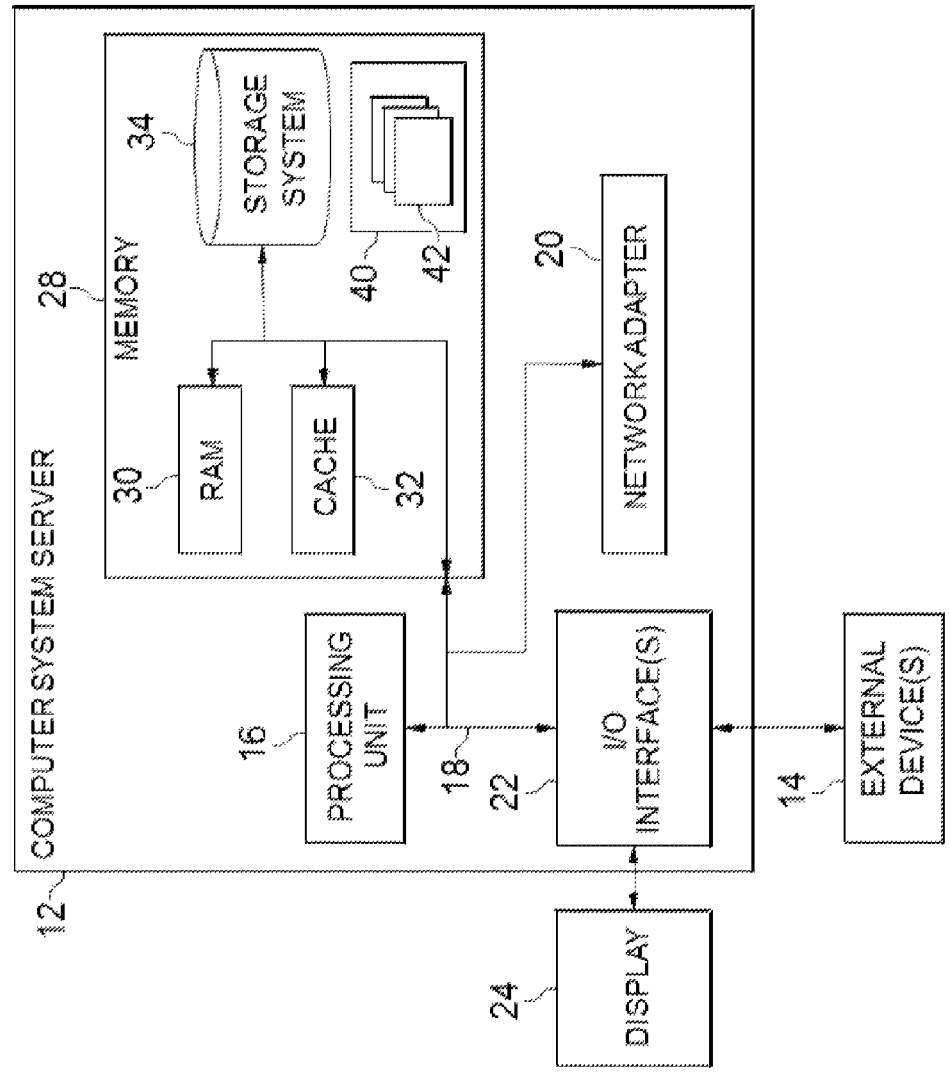
FIG. 14 depicts a cloud computing node according to an embodiment of the present disclosure.

Referring now to FIG. 14, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 15:
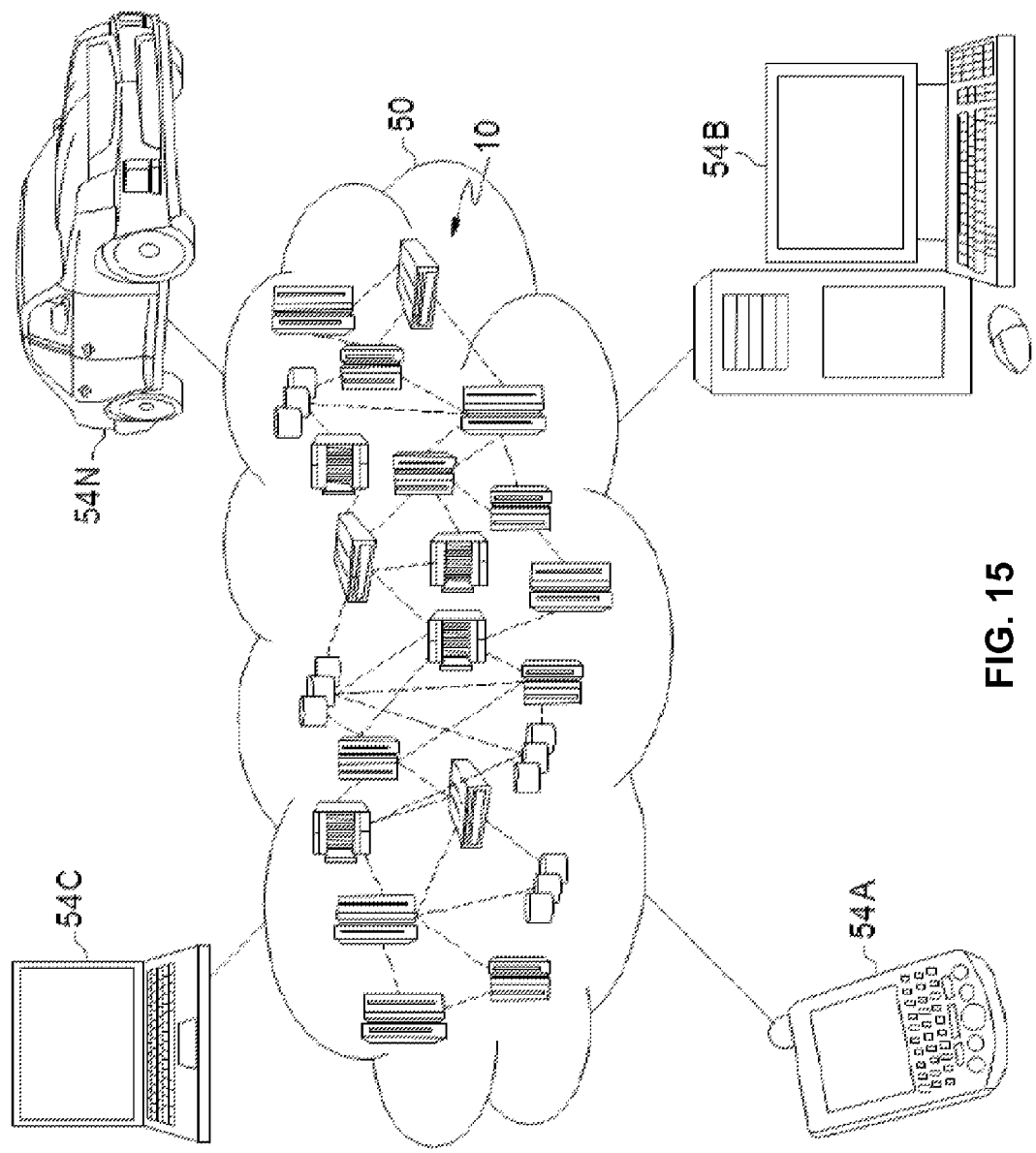
FIG. 15 depicts a cloud computing environment according to an embodiment of the present disclosure.

Referring now to FIG. 15, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 15 are intended to be illustrative only and that computing nodes 10 and cloud computing environment 50 can communicate with any type of computerized device over any type of network and/or network addressable connection (e.g., using a web browser).

Figure 16:
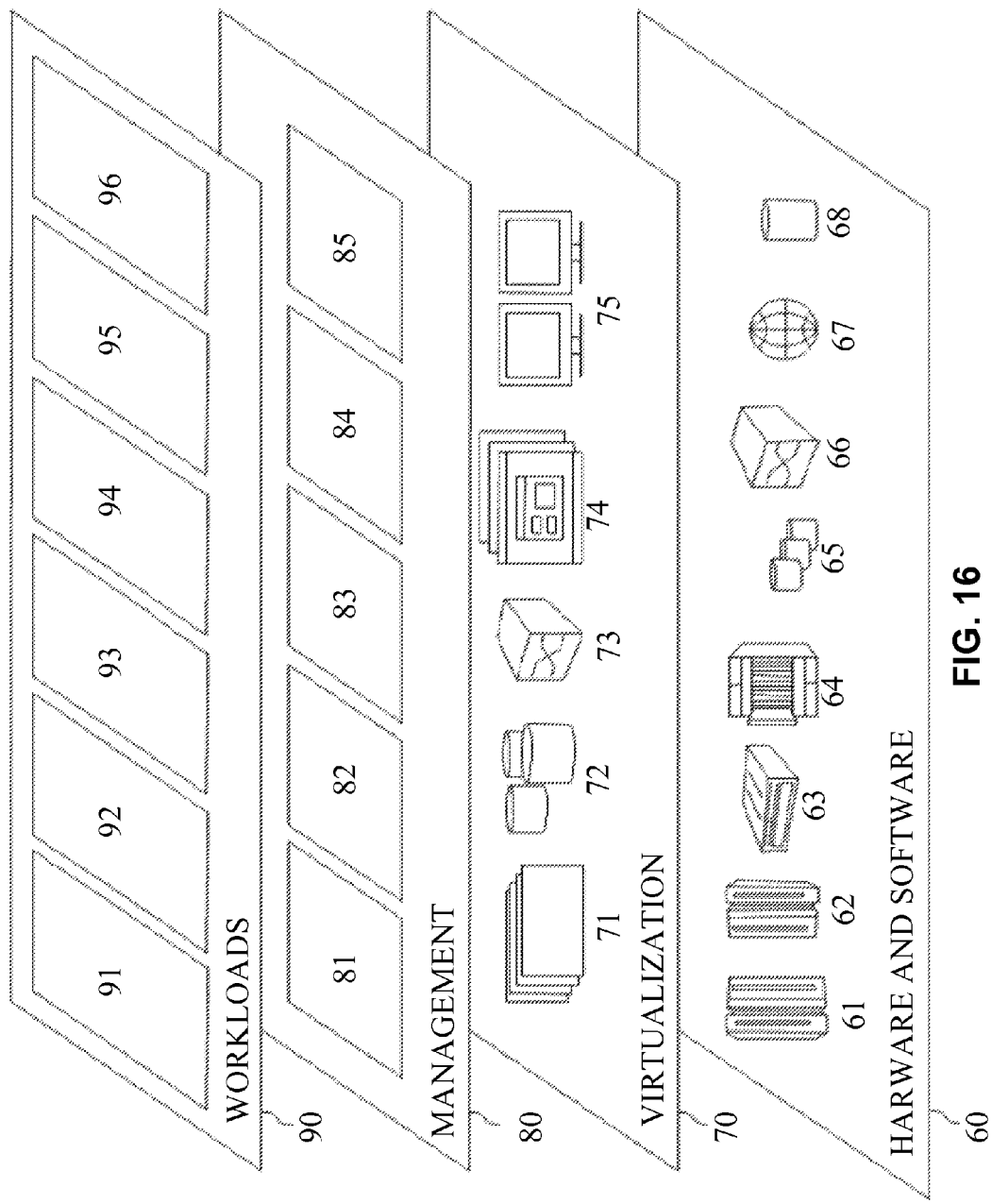
FIG. 16 depicts abstraction model layers according to an embodiment of the present disclosure.

Referring now to FIG. 16, a set of functional abstraction layers provided by cloud computing environment 50 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and detecting bottlenecks 96.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for detecting data flow disruptions over a series of data processing operators that are each configured to receive and store data in an input record block, process data from the input record block, store results of the processing in an output record block, and output data from the output record block to a next processing operator in the series, the method comprising:
    generating, for a particular processing operator in the series of data processing operators, a processing operator timing profile that includes:
        an input wait time based upon a period of time that a particular data set is stored in a particular input data record,
        an operator processing time based upon a period of time between a start of processing of the particular data set by the particular processing operator and a completion of the processing of the particular data set by the particular processing operator, and
        an output wait time based upon a period of time that the particular data set is stored in a particular output data record block;
    detecting, from the processing operator timing profile, a potential flow disruption condition;
    determining that the processing operator timing profile satisfies at least one rule from a set of flow disruption rules that are each associated with at least one corresponding recommendation;
    identifying, based on the at least one rule, a corresponding recommendation; and
    displaying, in response to identifying the corresponding recommendation, an identity of the particular processing operator and the corresponding recommendation, wherein the series of data processing operators are part of a system of operators working in a parallel processing environment, wherein the parallel processing environment comprises a conductor, a plurality of section leaders, and a plurality of players, and wherein a section leader of the plurality of section leaders is configured to create a record block I/O monitoring thread to implement the generating, for the particular processing operator in the series of processing operators, the processing operator timing profile in the parallel processing environment.

2. The computer implemented method of claim 1, wherein the displaying the identity of the particular processing operator and the corresponding recommendation occurs via a user interface, the user interface part of a job execution design recommendation of a performance management system.

3. The computer implemented method of claim 1, further comprising, in response to the identifying the corresponding recommendation, implementing the recommendation, based on settings in a performance management system.

4. A computer system for detecting data flow disruptions over a series of data processing operators that are each configured to receive and store data in an input record block, process data from the input record block, store results of the processing in an output record block, and output data from the output record block to a next processing operator in the series, the system comprising:
    at least one processor circuit configured to:
        generate, for a particular processing operator in the series of data processing operators, a processing operator timing profile that includes:
            an input wait time based upon a period of time that a particular data set is stored in a particular input data record,
            an operator processing time based upon a period of time between a start of processing of the particular data set by the particular processing operator and a completion of the processing of the particular data set by the particular processing operator, and
            an output wait time based upon a period of time that the particular data set is stored in a particular output data record block;
        detect, from the processing operator timing profile, a potential flow disruption condition;
        determine that the processing operator timing profile satisfies at least one rule from a set of flow disruption rules that are each associated with at least one corresponding recommendation;
        identify, based on the at least one rule, a corresponding recommendation; and
        display, in response to identifying the corresponding recommendation, an identity of the particular processing operator and the corresponding recommendation, wherein the series of data processing operators are part of a system of operators working in a parallel processing environment, wherein the parallel processing environment comprises a conductor, a plurality of section leaders, and a plurality of players, and wherein a section leader of the plurality of section leaders is configured to create a record block I/O monitoring thread to implement the generating, for the particular processing operator in the series of processing operators, the processing operator timing profile in the parallel processing environment.

5. The computer system of claim 4, wherein the at least one processor circuit is configured to display the identity of the particular processing operator and the corresponding recommendation via a user interface, the user interface part of a job execution design recommendation of a performance management system.

6. The computer system of claim 4, wherein the at least one processor circuit is further configured implement the recommendation, in response to the identifying the corresponding recommendation, based on settings in a performance management system.

7. A computer program product for detecting data flow disruptions over a series of data processing operators that are each configured to receive and store data in an input record block, process data from the input record block, store results of the processing in an output record block, and output data from the output record block to a next processing operator in the series, the computer program product comprising a computer readable storage medium having program instructions embodied therewith, wherein the computer readable storage medium is not a transitory signal per se, the program instructions executable by a computer processing circuit to cause the circuit to perform the method comprising:

generating, for a particular processing operator in the series of data processing operators, a processing operator timing profile that includes:
  an input wait time based upon a period of time that a particular data set is stored in a particular input data record,
  an operator processing time based upon a period of time between a start of processing of the particular data set by the particular processing operator and a completion of the processing of the particular data set by the particular processing operator, and
  an output wait time based upon a period of time that the particular data set is stored in a particular output data record block;
detecting, from the processing operator timing profile, a potential flow disruption condition;
determining that the processing operator timing profile satisfies at least one rule from a set of flow disruption rules that are each associated with at least one corresponding recommendation;
identifying, based on the at least one rule, a corresponding recommendation; and
displaying, in response to identifying the corresponding recommendation, an identity of the particular processing operator and the corresponding recommendation, wherein the series of data processing operators are part of a system of operators working in a parallel processing environment, wherein the parallel processing environment comprises a conductor, a plurality of section leaders, and a plurality of players, and wherein a section leader of the plurality of section leaders is configured to create a record block I/O monitoring thread to implement the generating, for the particular processing operator in the series of processing operators, the processing operator timing profile in the parallel processing environment.

8. The computer program product of claim 7, wherein the displaying the identity of the particular processing operator and the corresponding recommendation occurs via a user interface, the user interface part of a job execution design recommendation of a performance management system.

9. The computer program product of claim 7, further comprising, in response to the identifying the corresponding recommendation, implementing the recommendation, based on settings in a performance management system.

* * * * *